United States Patent
Yao et al.

(10) Patent No.: US 12,522,806 B2
(45) Date of Patent: Jan. 13, 2026

(54) MUTANT GLUCOSE OXIDASE (GOD) HAVING IMPROVED THERMAL STABILITY AND GENE AND APPLICATION THEREOF

(71) Applicant: FEED RESEARCH INSTITUTE, CHINESE ACADEMY OF AGRICULTURAL SCIENCES, Beijing (CN)

(72) Inventors: Bin Yao, Beijing (CN); Tao Tu, Beijing (CN); Xiao Jiang, Beijing (CN); Huiying Luo, Beijing (CN); Xiaoyun Su, Beijing (CN); Huoqing Huang, Beijing (CN); Yaru Wang, Beijing (CN); Yingguo Bai, Beijing (CN); Yuan Wang, Beijing (CN); Xia Shi, Beijing (CN); Jie Zhang, Beijing (CN)

(*) Notice: Subject to any disclaimer, the term of this patent is extended or adjusted under 35 U.S.C. 154(b) by 745 days.

(21) Appl. No.: 17/630,177

(22) PCT Filed: Nov. 13, 2019

(86) PCT No.: PCT/CN2019/117826
§ 371 (c)(1),
(2) Date: Jan. 26, 2022

(87) PCT Pub. No.: WO2021/017292
PCT Pub. Date: Feb. 4, 2021

(65) Prior Publication Data
US 2023/0193215 A1    Jun. 22, 2023

(30) Foreign Application Priority Data
Jul. 26, 2019    (CN) .......................... 201910681815.3

(51) Int. Cl.
*C12N 9/04* (2006.01)
*C12N 15/81* (2006.01)

(52) U.S. Cl.
CPC ......... *C12N 9/0006* (2013.01); *C12N 15/815* (2013.01); *C12Y 101/03004* (2013.01)

(58) Field of Classification Search
CPC ................ C12N 9/0006; C12N 15/815; C12Y 101/03004; C12R 2001/685; C12R 2001/84
See application file for complete search history.

(56) References Cited

U.S. PATENT DOCUMENTS 11,434,473 B2 * 9/2022 Yao ...................... C12N 15/815

FOREIGN PATENT DOCUMENTS

| CN | 101955953 A | 1/2011 |
| CN | 103525778 A | 1/2014 |

(Continued)

OTHER PUBLICATIONS

Singh et al., Curr. Protein Pept. Sci. 18: 1-11, 2017. (Year: 2017).*

(Continued)

*Primary Examiner* — Sharmila G Landau
(74) *Attorney, Agent, or Firm* — Patshegen IP; Mosche Pinchas

(57) ABSTRACT

The present invention relates to the field of genetic engineering, particularly to a glucose oxidase mutant having improved thermal stability, gene and application thereof. The present invention provides several glucose oxidase GOD mutants with high catalytic efficiency and improved thermal stability, which breaks the barrier of low enzyme activity and poor stability and is suited well to meet the requirements of application to the fields of food, medicine, feed and textile industry, and has a very broad application prospect.

2 Claims, 2 Drawing Sheets

Specification includes a Sequence Listing.

(56) References Cited

FOREIGN PATENT DOCUMENTS

| | | | |
|---|---|---|---|
| CN | 105950578 | A | 9/2016 |
| CN | 107189991 | A | 9/2017 |
| CN | 108374001 | A | 8/2018 |
| CN | 108893453 | A | 11/2018 |

OTHER PUBLICATIONS

Zhang et al., Structure 26: 1474-1485, 2018. (Year: 2018).*
Tu T, Wang Y, Huang H, Wang Y, Jiang X, Wang Z, Yao B, Luo H. Improving the thermostability and catalytic efficiency of glucose oxidase from Aspergillus niger by molecular evolution. Food Chem. May 30, 2019;281:163-170. doi: 10.1016/j.foodchem.2018.12.099. Epub Jan. 2, 2019. PMID: 30658743 (Year: 2018).*
ISR; China National Intellectual Property Administration; Feb. 10, 2021.

* cited by examiner

MUTANT GLUCOSE OXIDASE (GOD) HAVING IMPROVED THERMAL STABILITY AND GENE AND APPLICATION THEREOF

FIELD OF THE INVENTION

The present invention relates to the field of genetic engineering, particularly to glucose oxidase mutants having improved thermal stability, gene and application thereof.

BACKGROUND OF THE INVENTION

Glucose oxidase (GOD) is an important oxidase and belongs to the glucose/methol/choline (GMC) oxidoreductase family GOD specifically catalyzes the substrate β-D-glucose to produce gluconic acid and hydrogen peroxide with oxygen. The mechanism of glucose oxidation is the oxidoreductase system consisting of glucose oxidase and catalase, wherein glucose oxidase can oxidize glucose to produce D-gluconolactone in the presence of molecular oxygen taking FAD as cofactor and consume oxygen to produce hydrogen peroxide, and catalase can decompose hydrogen peroxide into water capable of combining with glucolactone to produce gluconic acid and oxygen. GOD is a homodimeric enzyme polymerized by two 80 KD monomers together, each of which contains two regions, wherein one binds to FAD in a noncovalent form and the other binds to substrate β-D glucose. GDO is widely distributed in animals, plants and microorganisms wherein microorganisms are the main source producing GOD as they have the characteristics of fast growth and reproduction and wide variety. And, the main production strains are *Aspergillus niger* and penicillin.

GOD is widely used in the fields of chemistry, pharmacy, food, clinical diagnosis, biotechnology and so on, wherein GOD is added to feed to inhibit the growth of nutritious microorganisms and kill harmful intestinal microorganisms, produces gluconic acid capable of improving the pH of the intestine and facilitating the absorption of nutrients in the field of animal feed, and is also widely used in the food industry by being added during in the brewing process to resist oxidation, maintain flavor and preserve for a long time, because oxygen will be consumed in the catalytic process of glucose oxidase, and being added in bread production to improve the quality of flour, the specific volume and the aging resistance. The application filed of GOD is expanding based on its properties, and the requirement of market is increasing sharply. However, the defects of low yield and low enzyme activity limit its industrial development. CN108893453A disclosed a glucose oxidase mutant GOD-M5 muted from GOD derived from *Aspergillus niger*. Although thermal stability of glucose oxidase mutant GOD-M5 has been improved, it still couldn't meet the industrial requirements.

ORDER OF THE INVENTION

The order of the present invention is to provide glucose oxidase mutants GOD-M6, GOD-M7, GOD-M8, GOD-M9 and GOD-M10.

Another order of the present invention is to provide gene encoding any one of the above glucose oxidase GOD mutants.

Another order of the present invention is to provide a recombinant vector containing the genes encoding any one of the above glucose oxidase GOD mutants.

Another order of the present invention is to provide a recombinant strain containing the gene encoding any one of the above glucose oxidase GOD mutants.

Another order of the present invention is to provide a genetic engineering method for preparing any one of the above glucose oxidase GOD mutant2.

Another order of the present invention is to provide application of any one of the above glucose oxidase GOD mutants.

SUMMARY OF THE INVENTION

In a preferred embodiment of the present invention, the amino acid sequence of the glucose oxidase GOD mutant GOD-M5 is shown in SEQ ID NO: 1.

```
SEQ ID NO: 1:
    1 GIEASLLT DPKEVAGR TVDYIIAG GGLTGLTV

33 AARLTENP DITVLVIE SGSYESDR GPIIEDLN

65 AYGDIFGS SVDHAYET VCLATNNQ TALIRSGN

97 GLGGSTLV NGGTWTRP HKAQVDSW ETVFGNEG

129 WNWDSVAA YSLQAERA RAPNAKQI AAGHYFNA

161 SCHGINGT VHAGPRDT GDDYSPIV KALMSAVE

193 DRGVPTKK DLGCGDPH GVSMFPNT LHEDQVRS

225 DAAREWLL PNYQRPNL QVLTGQYV GKVLLSQN

257 ATTPRAVG VEFGTHKG NTHNVYAK HEVLLAAG

289 SAVSPTIL EYSGIGMK SILEPLGI KTVVDLPV

321 GLNLQDQT TSTVRSRI TSAGAGQG QAAWFATF

353 NETFGDYT EKAHELLN TKLEQWAE EAVARGGF

385 HNTTALLI QYENYRDW IVKDNVAY SELFLDTA

417 GEASFDVW DLLPFTRG YVHILDKD PYLRHFAY

449 DPQYFLNE LDLLGQAA ATQLARNI SNSGAMQT

481 YFAGETIP GDNLAYDA DLRAWVEY IPYHFRPN

513 YHGVGTCS MMPKEMGG VVDNAARV YGVQGLRV

545 IDGSIPPT QMSSHVMT VFYAMALK IADAVLAD

577 YASMQ*.
```

In a yet preferred embodiment of the present invention, Asp of position 68 of the glucose oxidase GOD mutant GOD-M5 is substituted with Lys to obtain the glucose oxidase mutant GOD-M6; Thr of position 274 of the glucose oxidase GOD mutant GOD-M6 is substituted with Phe, and Tyr of position 278 of the glucose oxidase GOD mutant GOD-M6 is substituted with Thr to obtain the glucose oxidase mutant GOD-M7; Ser of position 94 of the glucose oxidase GOD mutant GOD-M7 is substituted with Ala to obtain the glucose oxidase mutant GOD-M8; Thr of position 31 of the glucose oxidase GOD mutant GOD-M8 is substituted with Val to obtain the glucose oxidase mutant GOD-M9; and Gln of position 88 of the glucose oxidase GOD mutant GOD-M9 is substituted with Arg to obtain the glucose oxidase mutant GOD-M10.

In a further preferred embodiment, the amino acid sequence of the glucose oxidase mutant GOD-M6 is shown in SEQ ID NO: 2.

SEQ ID NO: 2:
```
  1 GIEASLLT DPKEVAGR TVDYIIAG GGLTGLTV
 33 AARLTENP DITVLVIE SGSYESDR GPIIEDLN
 65 AYGKIFGS SVDHAYET VCLATNNQ TALIRSGN
 97 GLGGSTLV NGGTWTRP HKAQVDSW ETVFGNEG
129 WNWDSVAA YSLQAERA RAPNAKQ IAAGHYFNA
161 SCHGINGT VHAGPRDT GDDYSPIV KALMSAVE
193 DRGVPTKK DLGCGDPH GVSMFPNT LHEDQVRS
225 DAAREWLL PNYQRPNL QVLTGQYV GKVLLSQN
257 ATTPRAVG VEFGTHKG NTHNVYAK HEVLLAAG
289 SAVSPTIL EYSGIGMK SILEPLGI KTVVDLPV
321 GLNLQDQT TSTVRSRI TSAGAGQG QAAWFATF
353 NETFGDYT EKAHELLN TKLEQWAE EAVARGGF
385 HNTTALLI QYENYRDW IVKDNVAY SELFLDTA
417 GEASFDVW DLLPFTRG YVHILDKD PYLRHFAY
449 DPQYFLNE LDLLGQAA ATQLARNI SNSGAMQT
481 YFAGETIP GDNLAYDA DLRAWVEY IPYHFRPN
513 YHGVGTCS MMPKEMGG VVDNAARV YGVQGLRV
545 IDGSIPPT QMSSHVMT VFYAMALKIADAVLAD
577 YASMQ*.
```

In a further preferred embodiment, the amino acid sequence of the glucose oxidase mutant GOD-M7 is shown in SEQ ID NO:3.

SEQ ID NO: 3
```
  1 GIEASLLT DPKEVAGR TVDYIIAG GGLTGLTV
 33 AARLTENP DITVLVIE SGSYESDR GPIIEDLN
 65 AYGKIFGS SVDHAYET VCLATNNQ TALIRSGN
 97 GLGGSTLV NGGTWTRP HKAQVDSW ETVFGNEG
129 WNWDSVAA YSLQAERA RAPNAKQI AAGHYFNA
161 SCHGINGT VHAGPRDT GDDYSPIV KALMSAVE
193 DRGVPTKK DLGCGDPH GVSMFPNT LHEDQVRS
225 DAAREWLL PNYQRPNL QVLTGQYV GKVLLSQN
257 ATTPRAVG VEFGTHKG NFHNVTAK HEVLLAAG
289 SAVSPTIL EYSGIGMK SILEPLGI KTVVDLPV
321 GLNLQDQT TSTVRSRI TSAGAGQG QAAWFATF
353 NETFGDYT EKAHELLN TKLEQWAE EAVARGGF
385 HNTTALLI QYENYRDW IVKDNVAY SELFLDTA
417 GEASFDVW DLLPFTRG YVHILDKD PYLRHFAY
449 DPQYFLNE LDLLGQAA ATQLARNI SNSGAMQT
481 YFAGETIP GDNLAYDA DLRAWVEY IPYHFRPN
513 YHGVGTCS MMPKEMGG VVDNAARV YGVQGLRV
545 IDGSIPPT QMSSHVMT VFYAMALK IADAVLAD
577 YASMQ*.
```

In a further preferred embodiment, the amino acid sequence of the glucose oxidase mutant GOD-M8 is shown in SEQ ID NO:4.

SEQ ID NO: 4
```
  1 GIEASLLT DPKEVAGR TVDYIIAG GGLTGLTV
 33 AARLTENP DITVLVIE SGSYESDR GPIIEDLN
 65 AYGKIFGS SVDHAYET VCLATNNQ TALIRAGN
 97 GLGGSTLV NGGTWTRP HKAQVDSW ETVFGNEG
129 WNWDSVAA YSLQAERA RAPNAKQI AAGHYFNA
161 SCHGINGT VHAGPRDT GDDYSPIV KALMSAVE
193 DRGVPTKK DLGCGDPH GVSMFPNT LHEDQVRS
225 DAAREWLL PNYQRPNL QVLTGQYV GKVLLSQN
257 ATTPRAVG VEFGTHKG NFHNVTAK HEVLLAAG
289 SAVSPTIL EYSGIGMK SILEPLGI KTVVDLPV
321 GLNLQDQT TSTVRSRI TSAGAGQG QAAWFATF
353 NETFGDYT EKAHELLN TKLEQWAE EAVARGGF
385 HNTTALLI QYENYRDW IVKDNVAY SELFLDTA
417 GEASFDVW DLLPFTRG YVHILDKD PYLRHFAY
449 DPQYFLNE LDLLGQAA ATQLARNI SNSGAMQT
481 YFAGETIP GDNLAYDA DLRAWVEY IPYHFRPN
513 YHGVGTCS MMPKEMGG VVDNAARV YGVQGLRV
545 IDGSIPPT QMSSHVMT VFYAMALK IADAVLAD
577 YASMQ*.
```

In a further preferred embodiment, the amino acid sequence of the glucose oxidase mutant GOD-M9 is shown in SEQ ID NO:5.

SEQ ID NO: 5:
```
  1 GIEASLLT DPKEVAGR TVDYIIAG GGLTGLVV
 33 AARLTENP DITVLVIE SGSYESDR GPIIEDLN
 65 AYGKIFGS SVDHAYET VCLATNNQ TALIRAGN
 97 GLGGSTLV NGGTWTRP HKAQVDSW ETVFGNEG
129 WNWDSVAA YSLQAERA RAPNAKQI AAGHYFNA
161 SCHGINGT VHAGPRDT GDDYSPIV KALMSAVE
193 DRGVPTKK DLGCGDPH GVSMFPNT LHEDQVRS
225 DAAREWLL PNYQRPNL QVLTGQYV GKVLLSQN
257 ATTPRAVG VEFGTHKG NFHNVTAK HEVLLAAG
289 SAVSPTIL EYSGIGMK SILEPLGI KTVVDLPV
321 GLNLQDQT TSTVRSRI TSAGAGQG QAAWFATF
```

```
353 NETFGDYT EKAHELLN TKLEQWAE EAVARGGF

385 HNTTALLI QYENYRDW IVKDNVAY SELFLDTA

417 GEASFDVW DLLPFTRG YVHILDKD PYLRHFAY

449 DPQYFLNE LDLLGQAA ATQLARNI SNSGAMQT

481 YFAGETIP GDNLAYDA DLRAWVEY IPYHFRPN

513 YHGVGTCS MMPKEMGG VVDNAARV YGVQGLRV

545 IDGSIPPT QMSSHVMT VFYAMALK IADAVLAD

577 YASMQ*.
```

In a further preferred embodiment, the amino acid sequence of the glucose oxidase mutant GOD-M10 is shown in SEQ ID NO:6.

```
SEQ ID NO: 6:
  1 GIEASLLT DPKEVAGR TVDYIIAG GGLTGLVV

33 AARLTENP DITVLVIE SGSYESDR GPIIEDLN

65 AYGKIFGS SVDHAYET VCLATNNR TALIRAGN

97 GLGGSTLV NGGTWTRP HKAQVDSW ETVFGNEG

129 WNWDSVAA YSLQAERA RAPNAKQI AAGHYFNA

161 SCHGINGT VHAGPRDT GDDYSPIV KALMSAVE

193 DRGVPTKK DLGCGDPH GVSMFPNT LHEDQVRS

225 DAAREWLL PNYQRPNL QVLTGQYV GKVLLSQN

257 ATTPRAVG VEFGTHKG NFHNVTAK HEVLLAAG

289 SAVSPTIL EYSGIGMK SILEPLGI KTVVDLPV

321 GLNLQDQT TSTVRSRI TSAGAGQG QAAWFATF

353 NETFGDYT EKAHELLN TKLEQWAE EAVARGGF

385 HNTTALLI QYENYRDW IVKDNVAY SELFLDTA

417 GEASFDVW DLLPFTRG YVHILDKD PYLRHFAY

449 DPQYFLNE LDLLGQAA ATQLARNI SNSGAMQT

481 YFAGETIP GDNLAYDA DLRAWVEY IPYHFRPN

513 YHGVGTCS MMPKEMGG VVDNAARV YGVQGLRV

545 IDGSIPPT QMSSHVMT VFYAMALK IADAVLAD

577 YASMQ*.
```

The present invention provides a gene encoding the above glucose oxidase GOD mutant.

In a further preferred embodiment, the nucleotide sequence of the gene god-m5 encoding the glucose oxidase mutant GOD-M5 is shown in SEQ ID NO:7.

```
SEQ ID NO: 7:
   1 GGTATTGA GGCTTCCT TGTTGACT GACCCAAA GGAGGTCG

41 CCGGTAGA ACTGTTGA CTACATCA TTGCTGGT GGTGGATT

81 GACTGGTT TGACTGTC GCTGCCAG ATTGACTG AGAACCCA

121 GACATCAC CGTTTTGG TCATTGAG TCCGGTTC TTACGAAT

161 CTGATAGA GGTCCTAT CATTGAAG ACTTGAAC GCTTACGG

201 TGACATCT TCGGATCT TCCGTTGA CCACGCTT ACGAGACT

241 GTCTGCCT TGCCACTA ACAATCAA ACCGCTTT GATTAGAT

281 CCGGTAAC GGTTTGGG TGGTTCTA CTTTGGTT AACGGAGG

321 TACTTGGA CCAGACCA CACAAGGC TCAAGTTG ACTCTTGG

361 GAGACCGT CTTCGGTA ACGAAGGT TGGAATTG GGATTCTG

401 TCGCAGCT TACTCCTT GCAGGCCG AGAGAGCC CGTGCTCC

441 AAACGCTA AGCAAATC GCCGCAGG TCACTACT TCAACGCC

481 TCCTGTCA CGGTATTA ACGGAACT GTTCACGC TGGTCCAA

521 GAGACACC GGTGACGA TTACTCTC CTATCGTC AAGGCCTT

561 GATGTCCG CTGTTGAA GACAGAGG TGTCCCAA CTAAGAAG

601 GACTTGGG TTGCGGAG ACCCACAT GGTGTTTC TATGTTCC

641 CTAACACC TTGCACGA GGACCAAG TCAGATCC GATGCTGC

681 CCGTGAAT GGTTGCTT CCAAACTA CCAAAGAC CTAACTTG

721 CAGGTTTT GACCGGTC AATACGTT GGTAAGGT CCTTTTGT

761 CTCAAAAC GCCACTAC CCCAAGAG CTGTTGGT GTCGAGTT

801 CGGAACTC ACAAGGGT AACACCCA CAATGTTT ACGCTAAA

841 CACGAAGT CCTTTTGG CAGCTGGT TCCGCTGT TTCTCCAA

881 CTATCTTG GAGTACTC TGGTATCG GAATGAAG TCCATTTT

921 GGAACCAC TTGGTATT AAGACCGT CGTTGACT GCCTGTT

961 GGTCTGAA CTTGCAAG ACCAGACT ACCTCTAC TGTCAGAT

1001 CCCGTATT ACCTCCGC CGGTGCTG GACAGGGT CAGGCTGC

1041 CTGGTTTG CTACTTTC AACGAGAC CTTCGGTG ACTACACT

1081 GAGAAGGC TCACGAAT TGCTTAAC ACCAAATT GGAACAAT

1121 GGGCTGAG GAAGCCGT TGCTAGAG GTGGTTTC CACAACAC

1161 TACCGCTC TTTTGATC CAATACGA GAACTACA GAGACTGG

1201 ATTGTTAA GGATAACG TCGCTTAC TCTGAATT GTTCTTGG

1241 ACACTGCC GGTGAGGC TTCCTTCG ACGTCTGG GACTTGCT

1281 GCCATTCA CTAGAGGA TACGTTCA CATCTTGG ACAAGGAC

1321 CCATACTT GAGACACT TCGCTTAC GATCCTCA ATACTTCT

1361 TGAACGAG TTGGACTT GCTTGGTC AGGCTGCC GCTACTCA

1401 ATTGGCTA GAAACATC TCTAACTC CGGTGCCA TGCAAACT

1441 TACTTTGC TGGTGAAA CCATTCCA GGTGACAA CTTGGCCT

1481 ACGATGCT GACTTGAG AGCTTGGG TTGAATAC ATTCCATA

1521 CCACTTCA GACCTAAC TACCATGG TGTCGGAA CCTGTTCT

1561 ATGATGCC AAAGGAGA TGGGTGGT GTCGTTGA CAACGCCG

1601 CTAGAGTT TACGGTGT CCAGGGAT TGAGAGTT ATCGACGG

1641 TTCTATCC CACCTACT CAAATGTC CTCTCACG TTATGACC

1681 GTCTTCTA CGCTATGG CTTTGAAG ATCGCAGA CGCTGTTT

1721 TGGCTGAC TACGCCTC CATGCAAT AA.
```

In a further preferred embodiment, the nucleotide sequence of the gene god-m6 encoding the glucose oxidase mutant GOD-M6 is shown in SEQ ID NO:8.

SEQ ID NO: 8:

```
   1 GGTATTGA GGCTTCCT TGTTGACT GACCCAAA GGAGGTCG
  41 CCGGTAGA ACTGTTGA CTACATCA TTGCTGGT GGTGGATT
  81 GACTGGTT TGACTGTC GCTGCCAG ATTGACTG AGAACCCA
 121 GACATCAC CGTTTTGG TCATTGAG TCCGGTTC TTACGAAT
 161 CTGATAGA GGTCCTAT CATTGAAG ACTTGAAC GCTTACGG
 201 TAAAATCT TCGGATCT TCCGTTGA CCACGCTT ACGAGACT
 241 GTCTGCCT TGCCACTA ACAATCAA ACCGCTTT GATTAGAT
 281 CCGGTAAC GGTTTGGG TGGTTCTA CTTTGGTT AACGGAGG
 321 TACTTGGA CCAGACCA CACAAGGC TCAAGTTG ACTCTTGG
 361 GAGACCGT CTTCGGTA ACGAAGGT TGGAATTG GGATTCTG
 401 TCGCAGCT TACTCCTT GCAGGCCG AGAGAGCC CGTGCTCC
 441 AAACGCTA AGCAAATC GCCGCAGG TCACTACT TCAACGCC
 481 TCCTGTCA CGGTATTA ACGGAACT GTTCACGC TGGTCCAA
 521 GAGACACC GGTGACGA TTACTCTC CTATCGTC AAGGCCTT
 561 GATGTCCG CTGTTGAA GACAGAGG TGTCCCAA CTAAGAAG
 601 GACTTGGG TTGCGGAG ACCCACAT GGTGTTTC TATGTTCC
 641 CTAACACC TTGCACGA GGACCAAG TCAGATCC GATGCTGC
 681 CCGTGAAT GGTTGCTT CCAAACTA CCAAAGAC CTAACTTG
 721 CAGGTTTT GACCGGTC AATACGTT GGTAAGGT CCTTTTGT
 761 CTCAAAAC GCCACTAC CCCAAGAG CTGTTGGT GTCGAGTT
 801 CGGAACTC ACAAGGGT AACACCCA CAATGTTT ACGCTAAA
 841 CACGAAGT CCTTTTGG CAGCTGGT TCCGCTGT TTCTCCAA
 881 CTATCTTG GAGTACTC TGGTATCG GAATGAAG TCCATTTT
 921 GGAACCAC TTGGTATT AAGACCGT CGTTGACT TGCCTGTT
 961 GGTCTGAA CTTGCAAG ACCAGACT ACCTCTAC TGTCAGAT
1001 CCCGTATT ACCTCCGC CGGTGCTG GACAGGGT CAGGCTGC
1041 CTGGTTTG CTACTTTC AACGAGAC CTTCGGTG ACTACACT
1081 GAGAAGGC TCACGAAT TGCTTAAC ACCAAATT GGAACAAT
1121 GGGCTGAG GAAGCCGT TGCTAGAG GTGGTTTC CACAACAC
1161 TACCGCTC TTTTGATC CAATACGA GAACTACA GAGACTGG
1201 ATTGTTAA GGATAACG TCGCTTAC TCTGAATT GTTCTTGG
1241 ACACTGCC GGTGAGGC TTCCTTCG ACGTCTGG GACTTGCT
1281 GCCATTCA CTAGAGGA TACGTTCA CATCTTGG ACAAGGAC
1321 CCATACTT GAGACACT TCGCTTAC GATCCTCA ATACTTCT
1361 TGAACGAG TTGGACTT GCTTGGTC AGGCTGCC GCTACTCA
1401 ATTGGCTA GAAACATC TCTAACTC CGGTGCCA TGCAAACT
1441 TACTTTGC TGGTGAAA CCATTCCA GGTGACAA CTTGGCCT
1481 ACGATGCT GACTTGAG AGCTTGGG TTGAATAC ATTCCATA
1521 CCACTTCA GACCTAAC TACCATGG TGTCGGAA CCTGTTCT
1561 ATGATGCC AAAGGAGA TGGGTGGT GTCGTTGA CAACGCCG
1601 CTAGAGTT TACGGTGT CCAGGGAT TGAGAGTT ATCGACGG
1641 TTCTATCC CACCTACT CAAATGTC CTCTCACG TTATGACC
1681 GTCTTCTA CGCTATGG CTTTGAAG ATCGCAGA CGCTGTTT
1721 TGGCTGAC TACGCCTC CATGCAAT AA.
```

In a further preferred embodiment, the nucleotide sequence of the gene god-m7 encoding the glucose oxidase mutant GOD-M7 is shown in SEQ ID NO:9.

SEQ ID NO: 9:

```
   1 GGTATTGA GGCTTCCT TGTTGACT GACCCAAA GGAGGTCG
  41 CCGGTAGA ACTGTTGA CTACATCA TTGCTGGT GGTGGATT
  81 GACTGGTT TGACTGTC GCTGCCAG ATTGACTG AGAACCCA
 121 GACATCAC CGTTTTGG TCATTGAG TCCGGTTC TTACGAAT
 161 CTGATAGA GGTCCTAT CATTGAAG ACTTGAAC GCTTACGG
 201 TAAAATCT TCGGATCT TCCGTTGA CCACGCTT ACGAGACT
 241 GTCTGCCT TGCCACTA ACAATCAA ACCGCTTT GATTAGAT
 281 CCGGTAAC GGTTTGGG TGGTTCTA CTTTGGTT AACGGAGG
 321 TACTTGGA CCAGACCA CACAAGGC TCAAGTTG ACTCTTGG
 361 GAGACCGT CTTCGGTA ACGAAGGT TGGAATTG GGATTCTG
 401 TCGCAGCT TACTCCTT GCAGGCCG AGAGAGCC CGTGCTCC
 441 AAACGCTA AGCAAATC GCCGCAGG TCACTACT TCAACGCC
 481 TCCTGTCA CGGTATTA ACGGAACT GTTCACGC TGGTCCAA
 521 GAGACACC GGTGACGA TTACTCTC CTATCGTC AAGGCCTT
 561 GATGTCCG CTGTTGAA GACAGAGG TGTCCCAA CTAAGAAG
 601 GACTTGGG TTGCGGAG ACCCACAT GGTGTTTC TATGTTCC
 641 CTAACACC TTGCACGA GGACCAAG TCAGATCC GATGCTGC
 681 CCGTGAAT GGTTGCTT CCAAACTA CCAAAGAC CTAACTTG
 721 CAGGTTTT GACCGGTC AATACGTT GGTAAGGT CCTTTTGT
 761 CTCAAAAC GCCACTAC CCCAAGAG CTGTTGGT GTCGAGTT
 801 CGGAACTC ACAAGGGT AACTTTCA CAATGTTA CCGCTAAA
 841 CACGAAGT CCTTTTGG CAGCTGGT TCCGCTGT TTCTCCAA
 881 CTATCTTG GAGTACTC TGGTATCG GAATGAAG TCCATTTT
 921 GGAACCAC TTGGTATT AAGACCGT CGTTGACT TGCCTGTT
 961 GGTCTGAA CTTGCAAG ACCAGACT ACCTCTAC TGTCAGAT
1001 CCCGTATT ACCTCCGC CGGTGCTG GACAGGGT CAGGCTGC
1041 CTGGTTTG CTACTTTC AACGAGAC CTTCGGTG ACTACACT
1081 GAGAAGGC TCACGAAT TGCTTAAC ACCAAATT GGAACAAT
1121 GGGCTGAG GAAGCCGT TGCTAGAG GTGGTTTC CACAACAC
1161 TACCGCTC TTTTGATC CAATACGA GAACTACA GAGACTGG
1201 ATTGTTAA GGATAACG TCGCTTAC TCTGAATT GTTCTTGG
1241 ACACTGCC GGTGAGGC TTCCTTCG ACGTCTGG GACTTGCT
1281 GCCATTCA CTAGAGGA TACGTTCA CATCTTGG ACAAGGAC
```

-continued

```
1321 CCATACTT GAGACACT TCGCTTAC GATCCTCA ATACTTCT
1361 TGAACGAG TTGGACTT GCTTGGTC AGGCTGCC GCTACTCA
1401 ATTGGCTA GAAACATC TCTAACTC CGGTGCCA TGCAAACT
1441 TACTTTGC TGGTGAAA CCATTCCA GGTGACAA CTTGGCCT
1481 ACGATGCT GACTTGAG AGCTTGGG TTGAATAC ATTCCATA
1521 CCACTTCA GACCTAAC TACCATGG TGTCGGAA CCTGTTCT
1561 ATGATGCC AAAGGAGA TGGGTGGT GTCGTTGA CAACGCCG
1601 CTAGAGTT TACGGTGT CCAGGGAT TGAGAGTT ATCGACGG
1641 TTCTATCC CACCTACT CAAATGTC CTCTCACG TTATGACC
1681 GTCTTCTA CGCTATGG CTTTGAAG ATCGCAGA CGCTGTTT
1721 TGGCTGAC TACGCCTC CATGCAAT AA
```

In a further preferred embodiment, the nucleotide sequence of the gene god-m8 encoding the glucose oxidase mutant GOD-M8 is shown in SEQ ID NO:10.

```
SEQ ID NO: 10:
   1 GGTATTGA GGCTTCCT TGTTGACT GACCCAAA GGAGGTCG
  41 CCGGTAGA ACTGTTGA CTACATCA TTGCTGGT GGTGGATT
  81 GACTGGTT TGACTGTC GCTGCCAG ATTGACTG AGAACCCA
 121 GACATCAC CGTTTTGG TCATTGAG TCCGGTTC TTACGAAT
 161 CTGATAGA GGTCCTAT CATTGAAG ACTTGAAC GCTTACGG
 201 TAAAATCT TCGGATCT TCCGTTGA CCACGCTT ACGAGACT
 241 GTCTGCCT TGCCACTA ACAATCAA ACCGCTTT GATTAGAG
 281 CTGGTAAC GGTTTGGG TGGTTCTA CTTTGGTT AACGGAGG
 321 TACTTGGA CCAGACCA CACAAGGC TCAAGTTG ACTCTTGG
 361 GAGACCGT CTTCGGTA ACGAAGGT TGGAATTG GGATTCTG
 401 TCGCAGCT TACTCCTT GCAGGCCG AGAGAGCC CGTGCTCC
 441 AAACGCTA AGCAAATC GCCGCAGG TCACTACT TCAACGCC
 481 TCCTGTCA CGGTATTA ACGGAACT GTTCACGC TGGTCCAA
 521 GAGACACC GGTGACGA TTACTCTC CTATCGTC AAGGCCTT
 561 GATGTCCG CTGTTGAA GACAGAGG TGTCCCAA CTAAGAAG
 601 GACTTGGG TTGCGGAG ACCCACAT GGTGTTTC TATGTTCC
 641 CTAACACC TTGCACGA GGACCAAG TCAGATCC GATGCTGC
 681 CCGTGAAT GGTTGCTT CCAAACTA CCAAAGAC CTAACTTG
 721 CAGGTTTT GACCGGTC AATACGTT GGTAAGGT CCTTTTGT
 761 CTCAAAAC GCCACTAC CCCAAGAG CTGTTGGT GTCGAGTT
 801 CGGAACTC ACAAGGGT AACTTTCA CAATGTTA CCGCTAAA
 841 CACGAAGT CCTTTTGG CAGCTGGT TCCGCTGT TTCTCCAA
 881 CTATCTTG GAGTACTC TGGTATCG GAATGAAG TCCATTTT
 921 GGAACCAC TTGGTATT AAGACCGT CGTTGACT TGCCTGTT
 961 GGTCTGAA CTTGCAAG ACCAGACT ACCTCTAC TGTCAGAT
1001 CCCGTATT ACCTCCGC CGGTGCTG GACAGGGT CAGGCTGC
1041 CTGGTTTG CTACTTTC AACGAGAC CTTCGGTG ACTACACT
1081 GAGAAGGC TCACGAAT TGCTTAAC ACCAAATT GGAACAAT
1121 GGGCTGAG GAAGCCGT TGCTAGAG GTGGTTTC CACAACAC
1161 TACCGCTC TTTTGATC CAATACGA GAACTACA GAGACTGG
1201 ATTGTTAA GGATAACG TCGCTTAC TCTGAATT GTTCTTGG
1241 ACACTGCC GGTGAGGC TTCCTTCG ACGTCTGG GACTTGCT
1281 GCCATTCA CTAGAGGA TACGTTCA CATCTTGG ACAAGGAC
1321 CCATACTT GAGACACT TCGCTTAC GATCCTCA ATACTTCT
1361 TGAACGAG TTGGACTT GCTTGGTC AGGCTGCC GCTACTCA
1401 ATTGGCTA GAAACATC TCTAACTC CGGTGCCA TGCAAACT
1441 TACTTTGC TGGTGAAA CCATTCCA GGTGACAA CTTGGCCT
1481 ACGATGCT GACTTGAG AGCTTGGG TTGAATAC ATTCCATA
1521 CCACTTCA GACCTAAC TACCATGG TGTCGGAA CCTGTTCT
1561 ATGATGCC AAAGGAGA TGGGTGGT GTCGTTGA CAACGCCG
1601 CTAGAGTT TACGGTGT CCAGGGAT TGAGAGTT ATCGACGG
1641 TTCTATCC CACCTACT CAAATGTC CTCTCACG TTATGACC
1681 GTCTTCTA CGCTATGG CTTTGAAG ATCGCAGA CGCTGTTT
1721 TGGCTGAC TACGCCTC CATGCAAT AA.
```

In a further preferred embodiment, the nucleotide sequence of the gene god-m9 encoding the glucose oxidase mutant GOD-M9 is shown in SEQ ID NO:11.

```
SEQ ID NO: 11:
   1 GGTATTGA GGCTTCCT TGTTGACT GACCCAAA GGAGGTCG
  41 CCGGTAGA ACTGTTGA CTACATCA TTGCTGGT GGTGGATT
  81 GACTGGTT TGGTTGTC GCTGCCAG ATTGACTG AGAACCCA
 121 GACATCAC CGTTTTGG TCATTGAG TCCGGTTC TTACGAAT
 161 CTGATAGA GGTCCTAT CATTGAAG ACTTGAAC GCTTACGG
 201 TAAAATCT TCGGATCT TCCGTTGA CCACGCTT ACGAGACT
 241 GTCTGCCT TGCCACTA ACAATCAA ACCGCTTT GATTAGAG
 281 CTGGTAAC GGTTTGGG TGGTTCTA CTTTGGTT AACGGAGG
 321 TACTTGGA CCAGACCA CACAAGGC TCAAGTTG ACTCTTGG
 361 GAGACCGT CTTCGGTA ACGAAGGT TGGAATTG GGATTCTG
 401 TCGCAGCT TACTCCTT GCAGGCCG AGAGAGCC CGTGCTCC
 441 AAACGCTA AGCAAATC GCCGCAGG TCACTACT TCAACGCC
 481 TCCTGTCA CGGTATTA ACGGAACT GTTCACGC TGGTCCAA
 521 GAGACACC GGTGACGA TTACTCTC CTATCGTC AAGGCCTT
 561 GATGTCCG CTGTTGAA GACAGAGG TGTCCCAA CTAAGAAG
 601 GACTTGGG TTGCGGAG ACCCACAT GGTGTTTC TATGTTCC
 641 CTAACACC TTGCACGA GGACCAAG TCAGATCC GATGCTGC
 681 CCGTGAAT GGTTGCTT CCAAACTA CCAAAGAC CTAACTTG
 721 CAGGTTTT GACCGGTC AATACGTT GGTAAGGT CCTTTTGT
```

```
 761 CTCAAAAC GCCACTAC CCCAAGAG CTGTTGGT GTCGAGTT

801 CGGAACTC ACAAGGGT AACTTTCA CAATGTTA CCGCTAAA

841 CACGAAGT CCTTTTGG CAGCTGGT TCCGCTGT TTCTCCAA

881 CTATCTTG GAGTACTC TGGTATCG AATGAAG TCCATTTT

921 GGAACCAC TTGGTATT AAGACCGT CGTTGACT TGCCTGTT

961 GGTCTGAA CTTGCAAG ACCAGACT ACCTCTAC TGTCAGAT

1001 CCCGTATT ACCTCCGC CGGTGCTG GACAGGGT CAGGCTGC

1041 CTGGTTTG CTACTTTC AACGAGAC CTTCGGTG ACTACACT

1081 GAGAAGGC TCACGAAT TGCTTAAC ACCAAATT GGAACAAT

1121 GGGCTGAG GAAGCCGT TGCTAGAG GTGGTTTC CACAACAC

1161 TACCGCTC TTTTGATC CAATACGA GAACTACA GAGACTGG

1201 ATTGTTAA GGATAACG TCGCTTAC TCTGAATT GTTCTTGG

1241 ACACTGCC GGTGAGGC TTCCTTCG ACGTCTGG GACTTGCT

1281 GCCATTCA CTAGAGGA TACGTTCA CATCTTGG ACAAGGAC

1321 CCATACTT GAGACACT TCGCTTAC GATCCTCA ATACTTCT

1361 TGAACGAG TTGGACTT GCTTGGTC AGGCTGCC GCTACTCA

1401 ATTGGCTA GAAACATC TCTAACTC CGGTGCCA TGCAAACT

1441 TACTTTGC TGGTGAAA CCATTCCA GGTGACAA CTTGGCCT

1481 ACGATGCT GACTTGAG AGCTTGGG TTGAATAC ATTCCATA

1521 CCACTTCA GACCTAAC TACCATGG TGTCGGAA CCTGTTCT

1561 ATGATGCC AAAGGAGA TGGGTGGT GTCGTTGA CAACGCCG

1601 CTAGAGTT TACGGTGT CCAGGGAT TGAGAGTT ATCGACGG

1641 TTCTATCC CACCTACT CAAATGTC CTCTCACG TTATGACC

1681 GTCTTCTA CGCTATGG CTTTGAAG ATCGCAGA CGCTGTTT

1721 TGGCTGAC TACGCCTC CATGCAAT AA.
```

In a further preferred embodiment, the nucleotide sequence of the gene god-m10 encoding the glucose oxidase mutant GOD-M10 is shown in SEQ ID NO:12.

```
SEQ ID NO: 12:
   1 GGTATTGA GGCTTCCT TGTTGACT GACCCAAA GGAGGTCG

41 CCGGTAGA ACTGTTGA CTACATCA TTGCTGGT GGTGGATT

81 GACTGGTT TGGTTGTC GCTGCCAG ATTGACTG AGAACCCA

121 GACATCAC CGTTTTGG TCATTGAG TCCGGTTC TTACGAAT

161 CTGATAGA GGTCCTAT CATTGAAG ACTTGAAC GCTTACGG

201 TAAAATCT TCGGATCT TCCGTTGA CCACGCTT ACGAGACT

241 GTCTGCCT TGCCACTA ACAATAGA ACCGCTTT GATTAGAG

281 CTGGTAAC GGTTTGGG TGGTTCTA CTTTGGTT AACGGAGG

321 TACTTGGA CCAGACCA CACAAGGC TCAAGTTG ACTCTTGG

361 GAGACCGT CTTCGGTA ACGAAGGT TGGAATTG GGATTCTG

401 TCGCAGCT TACTCCTT GCAGGCCG AGAGAGCC CGTGCTCC

441 AAACGCTA AGCAAATC GCCGCAGG TCACTACT TCAACGCC

481 TCCTGTCA CGGTATTA ACGGAACT GTTCACGC TGGTCCAA

521 GAGACACC GGTGACGA TTACTCTC CTATCGTC AAGGCCTT

561 GATGTCCG CTGTTGAA GACAGAGG TGTCCCAA CTAAGAAG

601 GACTTGGG TTGCGGAG ACCCACAT GGTGTTTC TATGTTCC

641 CTAACACC TTGCACGA GGACCAAG TCAGATCC GATGCTGC

681 CCGTGAAT GGTTGCTT CCAAACTA CCAAAGAC CTAACTTG

721 CAGGTTTT GACCGGTC AATACGTT GGTAAGGT CCTTTTGT

761 CTCAAAAC GCCACTAC CCCAAGAG CTGTTGGT GTCGAGTT

801 CGGAACTC ACAAGGGT AACTTTCA CAATGTTA CCGCTAAA

841 CACGAAGT CCTTTTGG CAGCTGGT TCCGCTGT TTCTCCAA

881 CTATCTTG GAGTACTC TGGTATCG AATGAAG TCCATTTT

921 GGAACCAC TTGGTATT AAGACCGT CGTTGACT TGCCTGTT

961 GGTCTGAA CTTGCAAG ACCAGACT ACCTCTAC TGTCAGAT

1001 CCCGTATT ACCTCCGC CGGTGCTG GACAGGGT CAGGCTGC

1041 CTGGTTTG CTACTTTC AACGAGAC CTTCGGTG ACTACACT

1081 GAGAAGGC TCACGAAT TGCTTAAC ACCAAATT GGAACAAT

1121 GGGCTGAG GAAGCCGT TGCTAGAG GTGGTTTC CACAACAC

1161 TACCGCTC TTTTGATC CAATACGA GAACTACA GAGACTGG

1201 ATTGTTAA GGATAACG TCGCTTAC TCTGAATT GTTCTTGG

1241 ACACTGCC GGTGAGGC TTCCTTCG ACGTCTGG GACTTGCT

1281 GCCATTCA CTAGAGGA TACGTTCA CATCTTGG ACAAGGAC

1321 CCATACTT GAGACACT TCGCTTAC GATCCTCA ATACTTCT

1361 TGAACGAG TTGGACTT GCTTGGTC AGGCTGCC GCTACTCA

1401 ATTGGCTA GAAACATC TCTAACTC CGGTGCCA TGCAAACT

1441 TACTTTGC TGGTGAAA CCATTCCA GGTGACAA CTTGGCCT

1481 ACGATGCT GACTTGAG AGCTTGGG TTGAATAC ATTCCATA

1521 CCACTTCA GACCTAAC TACCATGG TGTCGGAA CCTGTTCT

1561 ATGATGCC AAAGGAGA TGGGTGGT GTCGTTGA CAACGCCG

1601 CTAGAGTT TACGGTGT CCAGGGAT TGAGAGTT ATCGACGG

1641 TTCTATCC CACCTACT CAAATGTC CTCTCACG TTATGACC

1681 GTCTTCTA CGCTATGG CTTTGAAG ATCGCAGA CGCTGTTT

1721 TGGCTGAC TACGCCTC CATGCAAT AA.
```

In a further preferred embodiment, the bases GAC of position 202 to 204 of the gene god-m5 are muted into the bases AAA to obtain the gene god-m6 encoding said mutant GOD-M6; the bases ACC of position 820 to 822 of the gene god-m6 are muted into the bases TTT, and TTA of position 832 to 834 of the gene god-m6 are muted into the bases ACC to obtain the gene god-m7 encoding said mutant GOD-M7; the bases TCC of position 280 to 282 of the gene god-m7 are muted into the bases GCT to obtain the gene god-m8 encoding said mutant GOD-M8; the bases ACT of position 90 to 93 of the gene god-m8 are muted into the bases GTT to obtain the gene god-m9 encoding said mutant GOD-M9; and the bases AGA of position 262 to 264 of the gene god-m9 are muted into the bases CAA to obtain the gene god-m10 encoding said mutant GOD-M10.

The present invention provides recombinant vector comprising the gene encoding the abovementioned glucose oxidase GOD.

The present invention provides a recombinant strain comprising the above gene encoding the glucose oxidase GOD mutant. Preferably, said recombinant strain is *Pichia pastoris* strains GS115/GOD-M6, GS115/GOD-M7, GS115/GOD-M8, GS115/GOD-M9, and GS115/GOD-M10.

In a further preferred embodiment, the method of preparing glucose oxidase GOD with the improved thermal stability and catalytic activity comprises the following steps of transforming the host cells with the recombinant vector containing the gene encoding the above glucose oxidase GOD mutants to obtain the recombinant strains, culturing the obtained recombinant strains to induce the expression of recombinant glucose oxidase GOD mutants, and recovering and purifying the glucose oxidase GOD.

After being treated at 70° C. for 10 min, the relative residual enzyme activities of the glucose oxidase mutant GOD-M5 are 55%, and the relative residual enzyme activity of mutants GOD-M6, GOD-M7, GOD-M8, GOD-M9 and GOD-M10 is 60%, 71%, 75%, 99%, 100% respectively, demonstrating the glucose oxidase mutant of the present having improved thermal stability.

After treated at 80° C. for 2 min, the relative residual enzyme activity of the glucose oxidase mutant GOD-M5 is 35%, and the relative residual enzyme activity of mutants GOD-M6, GOD-M7, GOD-M8, GOD-M9 and GOD-M10 is 40%, 55%, 60%, 72%, 80% respectively, demonstrating the glucose oxidase mutant of the present having improved thermal stability wherein the relative residual enzyme activity of the mutant GOD-M10 is about 2.2 times of that of the mutant GOD-M5.

The present invention provides several glucose oxidase GOD mutants with high catalytic efficiency and improved thermal stability, which breaks the barrier of low enzyme activity and poor stability and is suited well to meet the requirements of application to the fields of food, medicine, feed and textile industry, and has a very broad application prospect.

BRIEF DESCRIPTIONS OF THE DRAWINGS

EMBODIMENT

Test Materials and Reagents

Figure 1:
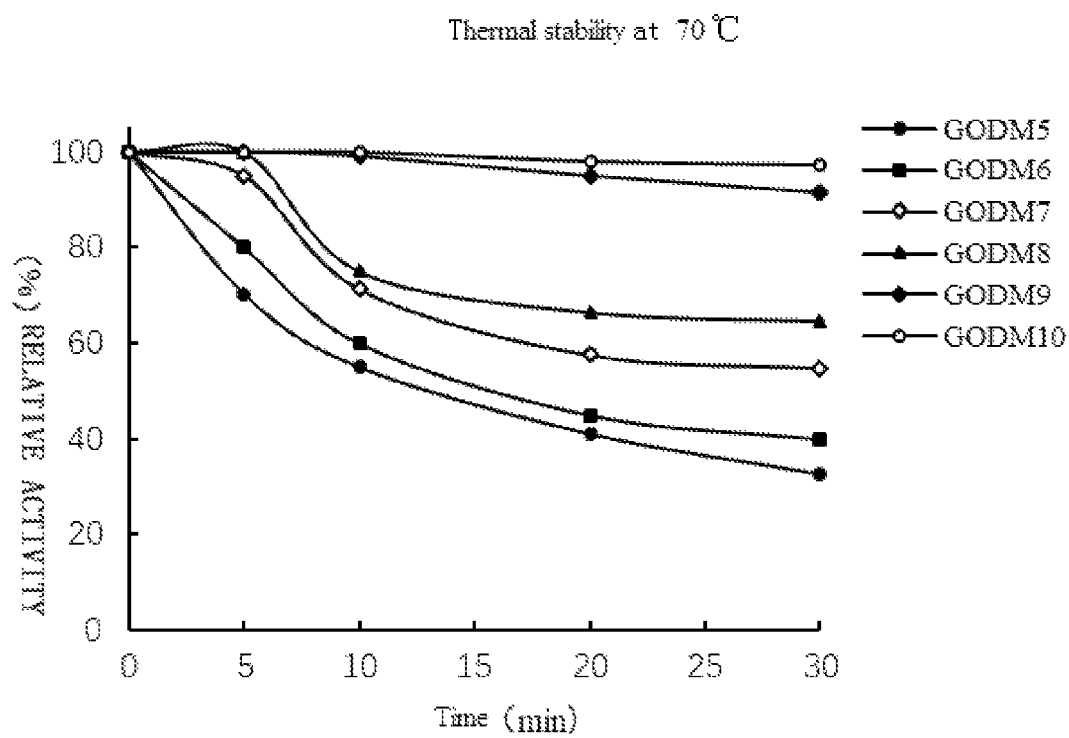
FIG. 1 shows the thermal stability of the mutant GOD-M5 and the mutants GOD-M5, GOD-M6, GOD-M7, GOD-M8, GOD-M9 and GOD-M10 at 70° C. for 10 min.

1. Strains and vectors: *Pichia pastoris* GS115 and expressing vector pPIC9.

2. Enzymes and other biochemical reagents: point mutation kit and other biochemical reagents were purchased by biochemical reagent company.

3. Medium:
LB medium: 5% yeast extract, 1% peptone, 1% NaCL, pH 7.0;
BMGY medium: 1% yeast extract, 2% peptone, 1% glycerol (V/V), 1.34% YNB, 0.00004% Biotin;
BMMY medium: 1% yeast extract, 2% peptone, 1.34% YNB, 0.00004% Biotin, 0.5% methanol (V/V).

Suitable biology laboratory methods not particularly mentioned in the examples as below can be found in Sambrook, et al. (*Molecular Cloning: A Laboratory Manual.* 2nd, ed., *Cold Spring Harbor Laboratory*, Cold Spring Harbor Laboratory Press, Cold Spring Harbor, N.Y., 1989), and other kit laboratory manuals.

Example 1 Site Directed Mutagenesis

The glucose oxidase mutant GOD-M5 was obtained by the steps of substituting amino acid Glu of position 82 of the glucose oxidase GOD having the acid sequence of SEQ ID No:1 from *Aspergillus niger* with the amino acid Cys to obtain the mutant GOD-M1, substituting the amino acid Val of position 418 of GOD-M1 with the amino acid Glu to obtain the mutant GOD-M2, substitute amino acid Asn of position 508 of GOD-M2 with the amino acid His to obtain the mutant GOD-M3, substituting the amino acid Thr of position 32 of GOD-M3 with the amino acid Val to obtain the mutant GOD-M4, and substituting the amino acid Asp of position 313 of GOD-M4 with the amino acid Lys to obtain the mutant GOD-M5.

And, Asp of position 68 of the glucose oxidase mutant GOD-M5 was muted into Lys using the recombinant plasmid pPIC9-godm5 as the temple to the mutant GOD-M6; Thr of position 274 of the glucose oxidase GOD mutant GOD-M6 is muted into Phe, and Tyr of position 278 of the glucose oxidase GOD mutant GOD-M6 is muted into Thr to obtain the glucose oxidase mutant GOD-M7; Ser of position 94 of the glucose oxidase GOD mutant GOD-M7 is muted into Ala to obtain the glucose oxidase mutant GOD-M8; Thr of position 31 of the glucose oxidase GOD mutant GOD-M8 is muted into Val to obtain the glucose oxidase mutant GOD-M9; and Gln of position 88 of the glucose oxidase GOD mutant GOD-M9 is muted into Arg to obtain the glucose oxidase mutant GOD-M10, wherein the mutation sites were introduced by site directed mutagenesis PCR and verified by sequencing. The primers for PCR were shown in Table 1:

TABLE 1

The mutant specific primers

| Primers | Sequences (5'→3') | Size (bp) |
| --- | --- | --- |
| D68KF | ACGCTTACGGTAAGATCTTCGGAT | 25 |
| D68FR | CTTACCGTAAGCGTTCAAGTCTTC | 25 |
| T274F/ Y278T F | ACTCACAAGGGTAACTTTCACAAT GTTACCGCTAAACACG | 41 |
| T274F/ Y278T R | GGTAACATTGTGAAAGTTACCCTT GTGAGTTCCGAACTCG | 41 |
| S94AF | ATTGAAGACTTGAACGCTTACGGTAAGA | 25 |
| S94AR | AGCGTTCAAGTCTTCAATGATAGGACCT | 25 |
| T31VF | GGATTGACTGGTTTGGTTGTCGCTGCCA | 25 |

TABLE 1-continued

The mutant specific primers

| Primers | Sequences (5'→3') | Size (bp) |
|---|---|---|
| T31VR | AACCAAACCAGTCAATCCACCACCAGCA | 25 |
| Q88RF | CTTGCCACTAACAATAGAACCGCTTTG | 25 |
| Q88RR | TCTATTGTTAGTGGCAAGGCAGACAGTC | 25 |

Example 2 Construction of Glucose Oxidase Engineering Strain

The PCR was performed by taking the recombinant plasmid pPIC9-godm5 as the template with the site directed mutagenesis reagent, followed by verifying by nucleic acid gel, adding 1 μL of DMT enzyme to the PCR product, mixing well and incubating at 37° C. for 1 hour. The PCR product was demethylated by 2 to 5 μL of DMT enzyme and transformed into DMT competent cells, followed by selecting monoclonal cells and verifying the positive transformants by DNA sequencing. The transformants confirmed by sequencing were used to prepare a large number of recombinant expression plasmids which were linearized with restriction endonuclease Bgl II, followed by transforming yeast GS115 competent cells by electric shock, culturing at 30° C. for 2 to 3 days, and selecting the transformants growing on MD plate for further expression experiment by referring to *Pichia pastoris* expression operation manual. The selected positive clones comprising the glucose oxidase mutants by color reaction on MM plate were GS115/GOD-M5, GS115/GOD-M6, GS115/GOD-M7, GS115/GOD-M8, GS115/GOD-M9 and GS115/GOD-M10 respectively.

Example 3 Preparation of Recombinant Glucose Oxidase (1) High Expression of Glucose Oxidase in *Pichia pastoris* at Shake Flask Level GS115 strain containing recombinant plasmid was inoculated into 300 mL of BMGY medium and incubated for 48 h at 30° C. and 220 rpm, followed by centrifuging at 4500 g for 5 min to remove the supernatant. The obtained precipitate was suspended for 48 hour in 200 mL of BMMY medium containing 0.5% of methanol to induce at 30° C. and 220 rpm with addition of 0.5 mL of methanol every 12 h to keep the concentration of methanol in the bacterial solution as 0.5%. After induction, the supernatant was recovered by spinning to test the activity of the enzyme and SDS page.

(2) Purification of Recombinant Glucose Oxidase

The supernatant of the recombinant glucose oxidase expressed in the shaking bottle was collected followed by being concentrated with 10 kDa membrane package while replacing the medium of the fermentation broth with 10 mM of disodium hydrogen phosphate citric acid buffer with pH of 6.5, and further purified by anion exchange column Example 4 Analysis of the Activity of Glucose Oxidase GOD Mutant The enzyme activity was determined by mixing 2.5 mL of o-anisidine buffer prepared by adding 0.2 mL of 1% o-anisidine to 25 mL of phosphate buffer in 0.1 M, 300 μL of 18% of glucose solution, 100 μL of 0.03% of horseradish peroxidase, and 100 μL of appropriate diluted release enzyme solution at pH6.0 to react for 3 min at 30° C., followed by adding 2 ml of $H_2SO_4$ in 2M to terminate the reaction and measuring the absorbance value at 540 nm. A unit of enzyme activity (U) is defined as the amount of enzyme required to produce 1 μmol gluconic acid and hydrogen peroxide per unit time under given conditions.

Measuring the enzyme activity and thermal stability of glucose oxidase GOD mutant and the parent glucose oxidase mutant GODMS as below.

1. The enzyme activities of the glucose oxidase GOD mutant purified in example 3 and the parent glucose oxidase mutant GODMS were determined by performing the enzymatic reaction at pH 6.0 and 30° C.

The specific activity of the parent glucose oxidase mutant GODMS was 366U/mg, and the activities of the mutants GOD-M6, GOD-M7, GOD-M8, GOD-M9 and GOD-M10 were 301.1 U/mg, 299.3 U/mg, 197.9 U/mg, 454 U/mg and 445.3 U/mg, respectively, wherein the specific activity of GOD-M10 was 1.2 times of that of GOD-M5.

2. Measuring the Thermal Stability of the Mutants and the Parent at 70° C. or 80° C.

The mutant glucose oxidase GOD and the parent were treated at 70° C. for 0, 2, 5, 10, 20, and 30 min respectively and 80° C. for 0, 1, 2 and 5 min respectively in 0.1 mol/L of citric acid disodium hydrogen phosphate buffer (pH 6.0), followed by measuring the relative residual enzyme activity at 30° C.

As shown in FIG. 1, the relative residual enzyme activity of GOD-M5 was 55% and the relative residual enzyme activities of the modified glucose oxidase mutants GOD-M6, GOD-M7, GOD-M8, GOD-M9 and GOD-M10 were 60%, 71%, 75%, 99% and 100% after 10 min treatment at 70° C.

Figure 2:
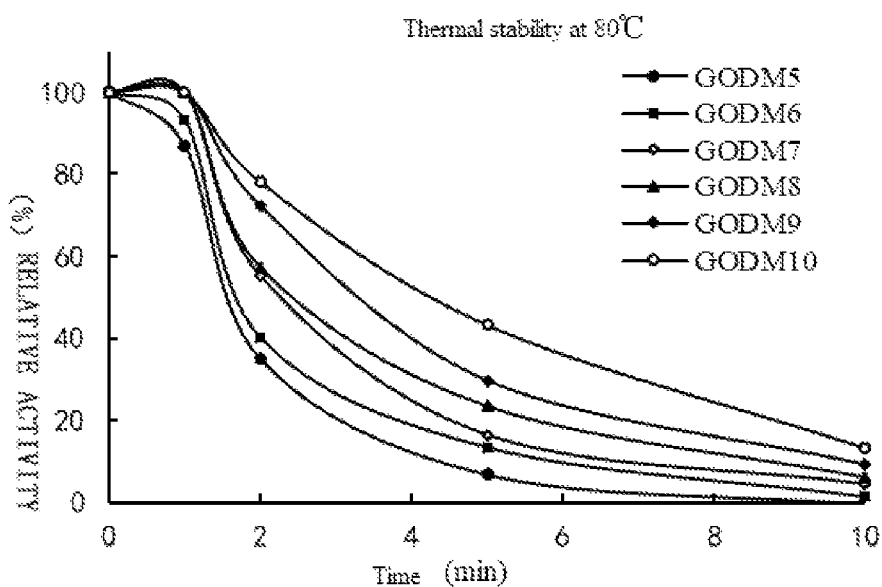
FIG. 2 shows the thermal stability of the mutant GOD-M5 and the mutants GOD-M5, GOD-M6, GOD-M7, GOD-M8, GOD-M9 and GOD-M10 at 80° C. for 2 min.
Figure 3:
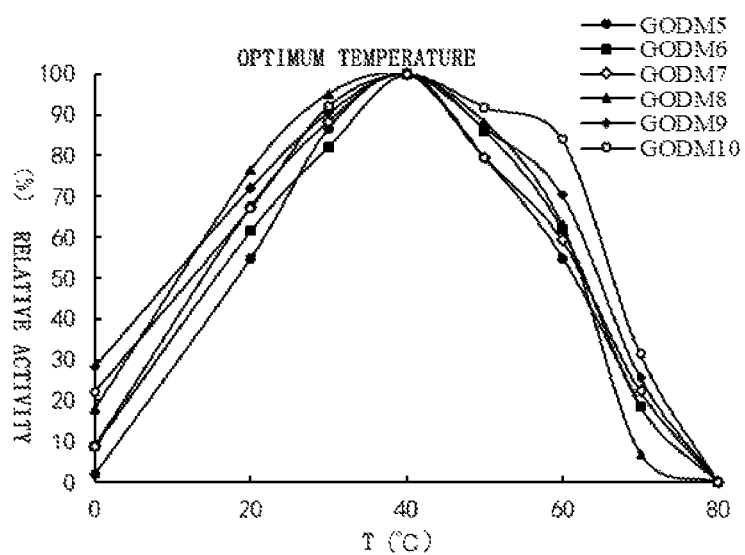
FIG. 3 shows the optimum temperature of the mutant GOD-M5 and the mutants GOD-M5, GOD-M6, GOD-M7, GOD-M8, GOD-M9 and GOD-M10.

And, as shown in FIG. 2, the relative residual enzyme activity of GOD-M5 oxidase GOD was 35%, and the relative residual enzyme activities of GOD-M6, GOD-M7, GOD-M8, GOD-M9 and GOD-M10 were 40%, 55%, 60%, 72% and 80% respectively, wherein the relative residual enzyme activity of GOD-M10 was 2 times of that of GOD-M5.

3. Determining the Optimum Temperature of Glucose Oxidase Mutants and the Parent The enzyme activities of GOD-M5, GOD-M6, GOD-M7, GOD-M8, GOD-M9 and GOD-M10 were measured at 0, 20, 30, 40, 50, 60, 70 and 80° C. in pH of 6.0. As shown in FIG. 2, the optimum temperatures of GOD-M5, GOD-M6, GOD-M7, GOD-M8, GOD-M9 and GOD-M10 were 40° C., and more than 50% of the relative residual enzyme activity can be maintained in the range of 20° C. to 70° C.

The invention claimed is:

1. A glucose oxidase mutant, wherein the amino acid sequence of the glucose oxidase mutant is SEQ ID NO:3, SEQ ID NO:4, or SEQ ID NO:5, wherein the glucose oxidase mutant has glucose oxidase activity.

2. A gene encoding the glucose oxidase GOD mutant of claim 1.

* * * * *

SEQUENCE LISTING

<160> NUMBER OF SEQ ID NOS: 11

<210> SEQ ID NO 1

```
<211> LENGTH: 581
<212> TYPE: PRT
<213> ORGANISM: Artificial Sequence
<220> FEATURE:
<223> OTHER INFORMATION: synthesized peptide

<400> SEQUENCE: 1
```

| | | | | | | | | | | | | | | |
|---|---|---|---|---|---|---|---|---|---|---|---|---|---|---|
| Gly | Ile | Glu | Ala | Ser | Leu | Leu | Thr | Asp | Pro | Lys | Glu | Val | Ala | Gly | Arg |
| 1 | | | | 5 | | | | | 10 | | | | | 15 | |
| Thr | Val | Asp | Tyr | Ile | Ile | Ala | Gly | Gly | Gly | Leu | Thr | Gly | Leu | Thr | Val |
| | | | 20 | | | | | 25 | | | | | 30 | | |
| Ala | Ala | Arg | Leu | Thr | Glu | Asn | Pro | Asp | Ile | Thr | Val | Leu | Val | Ile | Glu |
| | | | 35 | | | | | 40 | | | | | 45 | | |
| Ser | Gly | Ser | Tyr | Glu | Ser | Asp | Arg | Gly | Pro | Ile | Ile | Glu | Asp | Leu | Asn |
| | 50 | | | | | 55 | | | | | 60 | | | | |
| Ala | Tyr | Gly | Asp | Ile | Phe | Gly | Ser | Ser | Val | Asp | His | Ala | Tyr | Glu | Thr |
| 65 | | | | | 70 | | | | | 75 | | | | | 80 |
| Val | Cys | Leu | Ala | Thr | Asn | Asn | Gln | Thr | Ala | Leu | Ile | Arg | Ser | Gly | Asn |
| | | | | 85 | | | | | 90 | | | | | 95 | |
| Gly | Leu | Gly | Gly | Ser | Thr | Leu | Val | Asn | Gly | Gly | Thr | Trp | Thr | Arg | Pro |
| | | | | 100 | | | | | 105 | | | | | 110 | |
| His | Lys | Ala | Gln | Val | Asp | Ser | Trp | Glu | Thr | Val | Phe | Gly | Asn | Glu | Gly |
| | | | 115 | | | | | 120 | | | | | 125 | | |
| Trp | Asn | Trp | Asp | Ser | Val | Ala | Ala | Tyr | Ser | Leu | Gln | Ala | Glu | Arg | Ala |
| | 130 | | | | | 135 | | | | | 140 | | | | |
| Arg | Ala | Pro | Asn | Ala | Lys | Gln | Ile | Ala | Ala | Gly | His | Tyr | Phe | Asn | Ala |
| 145 | | | | | 150 | | | | | 155 | | | | | 160 |
| Ser | Cys | His | Gly | Ile | Asn | Gly | Thr | Val | His | Ala | Gly | Pro | Arg | Asp | Thr |
| | | | | 165 | | | | | 170 | | | | | 175 | |
| Gly | Asp | Asp | Tyr | Ser | Pro | Ile | Val | Lys | Ala | Leu | Met | Ser | Ala | Val | Glu |
| | | | | 180 | | | | | 185 | | | | | 190 | |
| Asp | Arg | Gly | Val | Pro | Thr | Lys | Lys | Asp | Leu | Gly | Cys | Gly | Asp | Pro | His |
| | | | 195 | | | | | 200 | | | | | 205 | | |
| Gly | Val | Ser | Met | Phe | Pro | Asn | Thr | Leu | His | Glu | Asp | Gln | Val | Arg | Ser |
| | 210 | | | | | 215 | | | | | 220 | | | | |
| Asp | Ala | Ala | Arg | Glu | Trp | Leu | Leu | Pro | Asn | Tyr | Gln | Arg | Pro | Asn | Leu |
| 225 | | | | | 230 | | | | | 235 | | | | | 240 |
| Gln | Val | Leu | Thr | Gly | Gln | Tyr | Val | Gly | Lys | Val | Leu | Leu | Ser | Gln | Asn |
| | | | | 245 | | | | | 250 | | | | | 255 | |
| Ala | Thr | Thr | Pro | Arg | Ala | Val | Gly | Val | Glu | Phe | Gly | Thr | His | Lys | Gly |
| | | | | 260 | | | | | 265 | | | | | 270 | |
| Asn | Thr | His | Asn | Val | Tyr | Ala | Lys | His | Glu | Val | Leu | Ala | Ala | Gly | |
| | | | 275 | | | | | 280 | | | | | 285 | | |
| Ser | Ala | Val | Ser | Pro | Thr | Ile | Leu | Glu | Tyr | Ser | Gly | Ile | Gly | Met | Lys |
| | 290 | | | | | 295 | | | | | 300 | | | | |
| Ser | Ile | Leu | Glu | Pro | Leu | Gly | Ile | Lys | Thr | Val | Val | Asp | Leu | Pro | Val |
| 305 | | | | | 310 | | | | | 315 | | | | | 320 |
| Gly | Leu | Asn | Leu | Gln | Asp | Gln | Thr | Thr | Ser | Thr | Val | Arg | Ser | Arg | Ile |
| | | | | 325 | | | | | 330 | | | | | 335 | |
| Thr | Ser | Ala | Gly | Ala | Gly | Gln | Gly | Gln | Ala | Ala | Trp | Phe | Ala | Thr | Phe |
| | | | | 340 | | | | | 345 | | | | | 350 | |
| Asn | Glu | Thr | Phe | Gly | Asp | Tyr | Thr | Glu | Lys | Ala | His | Glu | Leu | Leu | Asn |
| | | | 355 | | | | | 360 | | | | | 365 | | |
| Thr | Lys | Leu | Glu | Gln | Trp | Ala | Glu | Glu | Ala | Val | Ala | Arg | Gly | Gly | Phe |
| | 370 | | | | | 375 | | | | | 380 | | | | |

```
His Asn Thr Thr Ala Leu Leu Ile Gln Tyr Glu Asn Tyr Arg Asp Trp
385                 390                 395                 400

Ile Val Lys Asp Asn Val Ala Tyr Ser Glu Leu Phe Leu Asp Thr Ala
            405                 410                 415

Gly Glu Ala Ser Phe Asp Val Trp Asp Leu Leu Pro Phe Thr Arg Gly
            420                 425                 430

Tyr Val His Ile Leu Asp Lys Asp Pro Tyr Leu Arg His Phe Ala Tyr
            435                 440                 445

Asp Pro Gln Tyr Phe Leu Asn Glu Leu Asp Leu Leu Gly Gln Ala Ala
            450                 455                 460

Ala Thr Gln Leu Ala Arg Asn Ile Ser Asn Ser Gly Ala Met Gln Thr
465                 470                 475                 480

Tyr Phe Ala Gly Glu Thr Ile Pro Gly Asp Asn Leu Ala Tyr Asp Ala
            485                 490                 495

Asp Leu Arg Ala Trp Val Glu Tyr Ile Pro Tyr His Phe Arg Pro Asn
            500                 505                 510

Tyr His Gly Val Gly Thr Cys Ser Met Met Pro Lys Glu Met Gly Gly
            515                 520                 525

Val Val Asp Asn Ala Ala Arg Val Tyr Gly Val Gln Gly Leu Arg Val
            530                 535                 540

Ile Asp Gly Ser Ile Pro Pro Thr Gln Met Ser Ser His Val Met Thr
545                 550                 555                 560

Val Phe Tyr Ala Met Ala Leu Lys Ile Ala Asp Ala Val Leu Ala Asp
            565                 570                 575

Tyr Ala Ser Met Gln
            580

<210> SEQ ID NO 2
<211> LENGTH: 581
<212> TYPE: PRT
<213> ORGANISM: Artificial Sequence
<220> FEATURE:
<223> OTHER INFORMATION: synthesized peptide

<400> SEQUENCE: 2

Gly Ile Glu Ala Ser Leu Leu Thr Asp Pro Lys Glu Val Ala Gly Arg
1               5                   10                  15

Thr Val Asp Tyr Ile Ile Ala Gly Gly Gly Leu Thr Gly Leu Thr Val
            20                  25                  30

Ala Ala Arg Leu Thr Glu Asn Pro Asp Ile Thr Val Leu Val Ile Glu
            35                  40                  45

Ser Gly Ser Tyr Glu Ser Asp Arg Gly Pro Ile Ile Glu Asp Leu Asn
50                  55                  60

Ala Tyr Gly Lys Ile Phe Gly Ser Ser Val Asp His Ala Tyr Glu Thr
65                  70                  75                  80

Val Cys Leu Ala Thr Asn Asn Gln Thr Ala Leu Ile Arg Ser Gly Asn
            85                  90                  95

Gly Leu Gly Gly Ser Thr Leu Val Asn Gly Gly Thr Trp Thr Arg Pro
            100                 105                 110

His Lys Ala Gln Val Asp Ser Trp Glu Thr Val Phe Gly Asn Glu Gly
            115                 120                 125

Trp Asn Trp Asp Ser Val Ala Ala Tyr Ser Leu Gln Ala Glu Arg Ala
            130                 135                 140

Arg Ala Pro Asn Ala Lys Gln Ile Ala Ala Gly His Tyr Phe Asn Ala
145                 150                 155                 160
```

-continued

Ser Cys His Gly Ile Asn Gly Thr Val His Ala Gly Pro Arg Asp Thr
                165                 170                 175

Gly Asp Asp Tyr Ser Pro Ile Val Lys Ala Leu Met Ser Ala Val Glu
            180                 185                 190

Asp Arg Gly Val Pro Thr Lys Lys Asp Leu Gly Cys Gly Asp Pro His
        195                 200                 205

Gly Val Ser Met Phe Pro Asn Thr Leu His Glu Asp Gln Val Arg Ser
    210                 215                 220

Asp Ala Ala Arg Glu Trp Leu Leu Pro Asn Tyr Gln Arg Pro Asn Leu
225                 230                 235                 240

Gln Val Leu Thr Gly Gln Tyr Val Gly Lys Val Leu Leu Ser Gln Asn
                245                 250                 255

Ala Thr Thr Pro Arg Ala Val Gly Val Glu Phe Gly Thr His Lys Gly
            260                 265                 270

Asn Thr His Asn Val Tyr Ala Lys His Glu Val Leu Leu Ala Ala Gly
        275                 280                 285

Ser Ala Val Ser Pro Thr Ile Leu Glu Tyr Ser Gly Ile Gly Met Lys
    290                 295                 300

Ser Ile Leu Glu Pro Leu Gly Ile Lys Thr Val Val Asp Leu Pro Val
305                 310                 315                 320

Gly Leu Asn Leu Gln Asp Gln Thr Thr Ser Thr Val Arg Ser Arg Ile
                325                 330                 335

Thr Ser Ala Gly Ala Gly Gln Gly Gln Ala Ala Trp Phe Ala Thr Phe
            340                 345                 350

Asn Glu Thr Phe Gly Asp Tyr Thr Glu Lys Ala His Glu Leu Leu Asn
        355                 360                 365

Thr Lys Leu Glu Gln Trp Ala Glu Ala Val Ala Arg Gly Gly Phe
    370                 375                 380

His Asn Thr Thr Ala Leu Leu Ile Gln Tyr Glu Asn Tyr Arg Asp Trp
385                 390                 395                 400

Ile Val Lys Asp Asn Val Ala Tyr Ser Glu Leu Phe Leu Asp Thr Ala
                405                 410                 415

Gly Glu Ala Ser Phe Asp Val Trp Asp Leu Leu Pro Phe Thr Arg Gly
            420                 425                 430

Tyr Val His Ile Leu Asp Lys Asp Pro Tyr Leu Arg His Phe Ala Tyr
        435                 440                 445

Asp Pro Gln Tyr Phe Leu Asn Glu Leu Asp Leu Leu Gly Gln Ala Ala
    450                 455                 460

Ala Thr Gln Leu Ala Arg Asn Ile Ser Asn Ser Gly Ala Met Gln Thr
465                 470                 475                 480

Tyr Phe Ala Gly Glu Thr Ile Pro Gly Asp Asn Leu Ala Tyr Asp Ala
                485                 490                 495

Asp Leu Arg Ala Trp Val Glu Tyr Ile Pro Tyr His Phe Arg Pro Asn
            500                 505                 510

Tyr His Gly Val Gly Thr Cys Ser Met Met Pro Lys Glu Met Gly Gly
        515                 520                 525

Val Val Asp Asn Ala Ala Arg Val Tyr Gly Val Gln Gly Leu Arg Val
    530                 535                 540

Ile Asp Gly Ser Ile Pro Pro Thr Gln Met Ser Ser His Val Met Thr
545                 550                 555                 560

Val Phe Tyr Ala Met Ala Leu Lys Ile Ala Asp Ala Val Leu Ala Asp
                565                 570                 575

Tyr Ala Ser Met Gln
            580

<210> SEQ ID NO 3
<211> LENGTH: 581
<212> TYPE: PRT
<213> ORGANISM: Artificial Sequence
<220> FEATURE:
<223> OTHER INFORMATION: synthesized peptide

<400> SEQUENCE: 3

Gly Ile Glu Ala Ser Leu Leu Thr Asp Pro Lys Glu Val Ala Gly Arg
1               5                   10                  15

Thr Val Asp Tyr Ile Ile Ala Gly Gly Gly Leu Thr Gly Leu Thr Val
            20                  25                  30

Ala Ala Arg Leu Thr Glu Asn Pro Asp Ile Thr Val Leu Val Ile Glu
        35                  40                  45

Ser Gly Ser Tyr Glu Ser Asp Arg Gly Pro Ile Ile Glu Asp Leu Asn
    50                  55                  60

Ala Tyr Gly Lys Ile Phe Gly Ser Ser Val Asp His Ala Tyr Glu Thr
65                  70                  75                  80

Val Cys Leu Ala Thr Asn Asn Gln Thr Ala Leu Ile Arg Ser Gly Asn
                85                  90                  95

Gly Leu Gly Gly Ser Thr Leu Val Asn Gly Gly Thr Trp Thr Arg Pro
            100                 105                 110

His Lys Ala Gln Val Asp Ser Trp Glu Thr Val Phe Gly Asn Glu Gly
        115                 120                 125

Trp Asn Trp Asp Ser Val Ala Ala Tyr Ser Leu Gln Ala Glu Arg Ala
    130                 135                 140

Arg Ala Pro Asn Ala Lys Gln Ile Ala Ala Gly His Tyr Phe Asn Ala
145                 150                 155                 160

Ser Cys His Gly Ile Asn Gly Thr Val His Ala Gly Pro Arg Asp Thr
                165                 170                 175

Gly Asp Asp Tyr Ser Pro Ile Val Lys Ala Leu Met Ser Ala Val Glu
            180                 185                 190

Asp Arg Gly Val Pro Thr Lys Lys Asp Leu Gly Cys Gly Asp Pro His
        195                 200                 205

Gly Val Ser Met Phe Pro Asn Thr Leu His Glu Asp Gln Val Arg Ser
    210                 215                 220

Asp Ala Ala Arg Glu Trp Leu Leu Pro Asn Tyr Gln Arg Pro Asn Leu
225                 230                 235                 240

Gln Val Leu Thr Gly Gln Tyr Val Gly Lys Val Leu Leu Ser Gln Asn
                245                 250                 255

Ala Thr Thr Pro Arg Ala Val Gly Val Glu Phe Gly Thr His Lys Gly
            260                 265                 270

Asn Phe His Asn Val Thr Ala Lys His Glu Val Leu Leu Ala Ala Gly
        275                 280                 285

Ser Ala Val Ser Pro Thr Ile Leu Glu Tyr Ser Gly Ile Gly Met Lys
    290                 295                 300

Ser Ile Leu Glu Pro Leu Gly Ile Lys Thr Val Val Asp Leu Pro Val
305                 310                 315                 320

Gly Leu Asn Leu Gln Asp Gln Thr Thr Ser Thr Val Arg Ser Arg Ile
                325                 330                 335

Thr Ser Ala Gly Ala Gly Gln Gly Gln Ala Ala Trp Phe Ala Thr Phe
            340                 345                 350

```
Asn Glu Thr Phe Gly Asp Tyr Thr Glu Lys Ala His Glu Leu Leu Asn
            355                 360                 365
Thr Lys Leu Glu Gln Trp Ala Glu Ala Val Ala Arg Gly Gly Phe
    370                 375                 380
His Asn Thr Thr Ala Leu Leu Ile Gln Tyr Glu Asn Tyr Arg Asp Trp
385                 390                 395                 400
Ile Val Lys Asp Asn Val Ala Tyr Ser Glu Leu Phe Leu Asp Thr Ala
                405                 410                 415
Gly Glu Ala Ser Phe Asp Val Trp Asp Leu Leu Pro Phe Thr Arg Gly
            420                 425                 430
Tyr Val His Ile Leu Asp Lys Asp Pro Tyr Leu Arg His Phe Ala Tyr
        435                 440                 445
Asp Pro Gln Tyr Phe Leu Asn Glu Leu Asp Leu Leu Gly Gln Ala Ala
    450                 455                 460
Ala Thr Gln Leu Ala Arg Asn Ile Ser Asn Ser Gly Ala Met Gln Thr
465                 470                 475                 480
Tyr Phe Ala Gly Glu Thr Ile Pro Gly Asp Asn Leu Ala Tyr Asp Ala
                485                 490                 495
Asp Leu Arg Ala Trp Val Glu Tyr Ile Pro Tyr His Phe Arg Pro Asn
            500                 505                 510
Tyr His Gly Val Gly Thr Cys Ser Met Met Pro Lys Glu Met Gly Gly
        515                 520                 525
Val Val Asp Asn Ala Ala Arg Val Tyr Gly Val Gln Gly Leu Arg Val
    530                 535                 540
Ile Asp Gly Ser Ile Pro Pro Thr Gln Met Ser Ser His Val Met Thr
545                 550                 555                 560
Val Phe Tyr Ala Met Ala Leu Lys Ile Ala Asp Ala Val Leu Ala Asp
                565                 570                 575
Tyr Ala Ser Met Gln
            580

<210> SEQ ID NO 4
<211> LENGTH: 581
<212> TYPE: PRT
<213> ORGANISM: Artificial Sequence
<220> FEATURE:
<223> OTHER INFORMATION: synthesized peptide

<400> SEQUENCE: 4

Gly Ile Glu Ala Ser Leu Leu Thr Asp Pro Lys Glu Val Ala Gly Arg
1               5                   10                  15
Thr Val Asp Tyr Ile Ile Ala Gly Gly Gly Leu Thr Gly Leu Thr Val
                20                  25                  30
Ala Ala Arg Leu Thr Glu Asn Pro Asp Ile Thr Val Leu Val Ile Glu
            35                  40                  45
Ser Gly Ser Tyr Glu Ser Asp Arg Gly Pro Ile Ile Glu Asp Leu Asn
        50                  55                  60
Ala Tyr Gly Lys Ile Phe Gly Ser Ser Val Asp His Ala Tyr Glu Thr
65                  70                  75                  80
Val Cys Leu Ala Thr Asn Asn Gln Thr Ala Leu Ile Arg Ala Gly Asn
                85                  90                  95
Gly Leu Gly Gly Ser Thr Leu Val Asn Gly Gly Thr Trp Thr Arg Pro
            100                 105                 110
His Lys Ala Gln Val Asp Ser Trp Glu Thr Val Phe Gly Asn Glu Gly
        115                 120                 125
```

-continued

```
Trp Asn Trp Asp Ser Val Ala Ala Tyr Ser Leu Gln Ala Glu Arg Ala
    130                 135                 140

Arg Ala Pro Asn Ala Lys Gln Ile Ala Ala Gly His Tyr Phe Asn Ala
145                 150                 155                 160

Ser Cys His Gly Ile Asn Gly Thr Val His Ala Gly Pro Arg Asp Thr
                165                 170                 175

Gly Asp Asp Tyr Ser Pro Ile Val Lys Ala Leu Met Ser Ala Val Glu
            180                 185                 190

Asp Arg Gly Val Pro Thr Lys Lys Asp Leu Gly Cys Gly Asp Pro His
        195                 200                 205

Gly Val Ser Met Phe Pro Asn Thr Leu His Glu Asp Gln Val Arg Ser
210                 215                 220

Asp Ala Ala Arg Glu Trp Leu Leu Pro Asn Tyr Gln Arg Pro Asn Leu
225                 230                 235                 240

Gln Val Leu Thr Gly Gln Tyr Val Gly Lys Val Leu Leu Ser Gln Asn
                245                 250                 255

Ala Thr Thr Pro Arg Ala Val Gly Val Glu Phe Gly Thr His Lys Gly
            260                 265                 270

Asn Phe His Asn Val Thr Ala Lys His Glu Val Leu Leu Ala Ala Gly
        275                 280                 285

Ser Ala Val Ser Pro Thr Ile Leu Glu Tyr Ser Gly Ile Gly Met Lys
290                 295                 300

Ser Ile Leu Glu Pro Leu Gly Ile Lys Thr Val Val Asp Leu Pro Val
305                 310                 315                 320

Gly Leu Asn Leu Gln Asp Gln Thr Thr Ser Thr Val Arg Ser Arg Ile
                325                 330                 335

Thr Ser Ala Gly Ala Gly Gln Gly Gln Ala Ala Trp Phe Ala Thr Phe
            340                 345                 350

Asn Glu Thr Phe Gly Asp Tyr Thr Glu Lys Ala His Glu Leu Leu Asn
        355                 360                 365

Thr Lys Leu Glu Gln Trp Ala Glu Glu Ala Val Ala Arg Gly Gly Phe
370                 375                 380

His Asn Thr Thr Ala Leu Leu Ile Gln Tyr Glu Asn Tyr Arg Asp Trp
385                 390                 395                 400

Ile Val Lys Asp Asn Val Ala Tyr Ser Glu Leu Phe Leu Asp Thr Ala
                405                 410                 415

Gly Glu Ala Ser Phe Asp Val Trp Asp Leu Leu Pro Phe Thr Arg Gly
            420                 425                 430

Tyr Val His Ile Leu Asp Lys Asp Pro Tyr Leu Arg His Phe Ala Tyr
        435                 440                 445

Asp Pro Gln Tyr Phe Leu Asn Glu Leu Asp Leu Leu Gly Gln Ala Ala
450                 455                 460

Ala Thr Gln Leu Ala Arg Asn Ile Ser Asn Ser Gly Ala Met Gln Thr
465                 470                 475                 480

Tyr Phe Ala Gly Glu Thr Ile Pro Gly Asp Asn Leu Ala Tyr Asp Ala
                485                 490                 495

Asp Leu Arg Ala Trp Val Glu Tyr Ile Pro Tyr His Phe Arg Pro Asn
            500                 505                 510

Tyr His Gly Val Gly Thr Cys Ser Met Met Pro Lys Glu Met Gly Gly
        515                 520                 525

Val Val Asp Asn Ala Ala Arg Val Tyr Gly Val Gln Gly Leu Arg Val
530                 535                 540

Ile Asp Gly Ser Ile Pro Pro Thr Gln Met Ser Ser His Val Met Thr
```

```
            545                 550                 555                 560
Val Phe Tyr Ala Met Ala Leu Lys Ile Ala Asp Ala Val Leu Ala Asp
                565                 570                 575
Tyr Ala Ser Met Gln
                580

<210> SEQ ID NO 5
<211> LENGTH: 581
<212> TYPE: PRT
<213> ORGANISM: Artificial Sequence
<220> FEATURE:
<223> OTHER INFORMATION: synthesized peptide

<400> SEQUENCE: 5

Gly Ile Glu Ala Ser Leu Leu Thr Asp Pro Lys Glu Val Ala Gly Arg
1               5                   10                  15

Thr Val Asp Tyr Ile Ile Ala Gly Gly Gly Leu Thr Gly Leu Val Val
                20                  25                  30

Ala Ala Arg Leu Thr Glu Asn Pro Asp Ile Thr Val Leu Val Ile Glu
            35                  40                  45

Ser Gly Ser Tyr Glu Ser Asp Arg Gly Pro Ile Ile Glu Asp Leu Asn
50                  55                  60

Ala Tyr Gly Lys Ile Phe Gly Ser Ser Val Asp His Ala Tyr Glu Thr
65                  70                  75                  80

Val Cys Leu Ala Thr Asn Asn Gln Thr Ala Leu Ile Arg Ala Gly Asn
                85                  90                  95

Gly Leu Gly Gly Ser Thr Leu Val Asn Gly Gly Thr Trp Thr Arg Pro
            100                 105                 110

His Lys Ala Gln Val Asp Ser Trp Glu Thr Val Phe Gly Asn Glu Gly
        115                 120                 125

Trp Asn Trp Asp Ser Val Ala Ala Tyr Ser Leu Gln Ala Glu Arg Ala
130                 135                 140

Arg Ala Pro Asn Ala Lys Gln Ile Ala Ala Gly His Tyr Phe Asn Ala
145                 150                 155                 160

Ser Cys His Gly Ile Asn Gly Thr Val His Ala Gly Pro Arg Asp Thr
                165                 170                 175

Gly Asp Asp Tyr Ser Pro Ile Val Lys Ala Leu Met Ser Ala Val Glu
            180                 185                 190

Asp Arg Gly Val Pro Thr Lys Lys Asp Leu Gly Cys Gly Asp Pro His
        195                 200                 205

Gly Val Ser Met Phe Pro Asn Thr Leu His Glu Asp Gln Val Arg Ser
210                 215                 220

Asp Ala Ala Arg Glu Trp Leu Leu Pro Asn Tyr Gln Arg Pro Asn Leu
225                 230                 235                 240

Gln Val Leu Thr Gly Gln Tyr Val Gly Lys Val Leu Leu Ser Gln Asn
                245                 250                 255

Ala Thr Thr Pro Arg Ala Val Gly Val Glu Phe Gly Thr His Lys Gly
            260                 265                 270

Asn Phe His Asn Val Thr Ala Lys His Glu Val Leu Leu Ala Ala Gly
        275                 280                 285

Ser Ala Val Ser Pro Thr Ile Leu Glu Tyr Ser Gly Ile Gly Met Lys
290                 295                 300

Ser Ile Leu Glu Pro Leu Gly Ile Lys Thr Val Val Asp Leu Pro Val
305                 310                 315                 320

Gly Leu Asn Leu Gln Asp Gln Thr Thr Ser Thr Val Arg Ser Arg Ile
```

Thr Ser Ala Gly Ala Gly Gln Gly Gln Ala Ala Trp Phe Ala Thr Phe
                325                 330                 335
                    340                 345                 350

Asn Glu Thr Phe Gly Asp Tyr Thr Glu Lys Ala His Glu Leu Leu Asn
                    355                 360                 365

Thr Lys Leu Glu Gln Trp Ala Glu Ala Val Ala Arg Gly Gly Phe
                    370                 375                 380

His Asn Thr Thr Ala Leu Leu Ile Gln Tyr Glu Asn Tyr Arg Asp Trp
385                 390                 395                 400

Ile Val Lys Asp Asn Val Ala Tyr Ser Glu Leu Phe Leu Asp Thr Ala
                    405                 410                 415

Gly Glu Ala Ser Phe Asp Val Trp Asp Leu Leu Pro Phe Thr Arg Gly
                    420                 425                 430

Tyr Val His Ile Leu Asp Lys Asp Pro Tyr Leu Arg His Phe Ala Tyr
                    435                 440                 445

Asp Pro Gln Tyr Phe Leu Asn Glu Leu Asp Leu Leu Gly Gln Ala Ala
                    450                 455                 460

Ala Thr Gln Leu Ala Arg Asn Ile Ser Asn Ser Gly Ala Met Gln Thr
465                 470                 475                 480

Tyr Phe Ala Gly Glu Thr Ile Pro Gly Asp Asn Leu Ala Tyr Asp Ala
                    485                 490                 495

Asp Leu Arg Ala Trp Val Glu Tyr Ile Pro Tyr His Phe Arg Pro Asn
                    500                 505                 510

Tyr His Gly Val Gly Thr Cys Ser Met Met Pro Lys Glu Met Gly Gly
                    515                 520                 525

Val Val Asp Asn Ala Ala Arg Val Tyr Gly Val Gln Gly Leu Arg Val
                    530                 535                 540

Ile Asp Gly Ser Ile Pro Pro Thr Gln Met Ser Ser His Val Met Thr
545                 550                 555                 560

Val Phe Tyr Ala Met Ala Leu Lys Ile Ala Asp Ala Val Leu Ala Asp
                    565                 570                 575

Tyr Ala Ser Met Gln
            580

<210> SEQ ID NO 6
<211> LENGTH: 581
<212> TYPE: PRT
<213> ORGANISM: Artificial Sequence
<220> FEATURE:
<223> OTHER INFORMATION: synthesized peptide

<400> SEQUENCE: 6

Gly Ile Glu Ala Ser Leu Leu Thr Asp Pro Lys Glu Val Ala Gly Arg
1               5                   10                  15

Thr Val Asp Tyr Ile Ile Ala Gly Gly Gly Leu Thr Gly Leu Val Val
                    20                  25                  30

Ala Ala Arg Leu Thr Glu Asn Pro Asp Ile Thr Val Leu Val Ile Glu
                    35                  40                  45

Ser Gly Ser Tyr Glu Ser Asp Arg Gly Pro Ile Ile Glu Asp Leu Asn
                    50                  55                  60

Ala Tyr Gly Lys Ile Phe Gly Ser Ser Val Asp His Ala Tyr Glu Thr
65                  70                  75                  80

Val Cys Leu Ala Thr Asn Asn Arg Thr Ala Leu Ile Arg Ala Gly Asn
                    85                  90                  95

Gly Leu Gly Gly Ser Thr Leu Val Asn Gly Gly Thr Trp Thr Arg Pro

```
            100                 105                 110
His Lys Ala Gln Val Asp Ser Trp Glu Thr Val Phe Gly Asn Glu Gly
            115                 120                 125

Trp Asn Trp Asp Ser Val Ala Ala Tyr Ser Leu Gln Ala Glu Arg Ala
            130                 135             140

Arg Ala Pro Asn Ala Lys Gln Ile Ala Ala Gly His Tyr Phe Asn Ala
145                 150                 155                 160

Ser Cys His Gly Ile Asn Gly Thr Val His Ala Gly Pro Arg Asp Thr
                165                 170                 175

Gly Asp Asp Tyr Ser Pro Ile Val Lys Ala Leu Met Ser Ala Val Glu
            180                 185                 190

Asp Arg Gly Val Pro Thr Lys Lys Asp Leu Gly Cys Gly Asp Pro His
            195                 200                 205

Gly Val Ser Met Phe Pro Asn Thr Leu His Glu Asp Gln Val Arg Ser
            210                 215                 220

Asp Ala Ala Arg Glu Trp Leu Leu Pro Asn Tyr Gln Arg Pro Asn Leu
225                 230                 235                 240

Gln Val Leu Thr Gly Gln Tyr Val Gly Lys Val Leu Leu Ser Gln Asn
                245                 250                 255

Ala Thr Thr Pro Arg Ala Val Gly Val Glu Phe Gly Thr His Lys Gly
            260                 265                 270

Asn Phe His Asn Val Thr Ala Lys His Glu Val Leu Leu Ala Ala Gly
            275                 280                 285

Ser Ala Val Ser Pro Thr Ile Leu Glu Tyr Ser Gly Ile Gly Met Lys
            290                 295                 300

Ser Ile Leu Glu Pro Leu Gly Ile Lys Thr Val Val Asp Leu Pro Val
305                 310                 315                 320

Gly Leu Asn Leu Gln Asp Gln Thr Thr Ser Thr Val Arg Ser Arg Ile
                325                 330                 335

Thr Ser Ala Gly Ala Gly Gln Gly Gln Ala Ala Trp Phe Ala Thr Phe
            340                 345                 350

Asn Glu Thr Phe Gly Asp Tyr Thr Glu Lys Ala His Glu Leu Leu Asn
            355                 360                 365

Thr Lys Leu Glu Gln Trp Ala Glu Glu Ala Val Ala Arg Gly Gly Phe
            370                 375                 380

His Asn Thr Thr Ala Leu Leu Ile Gln Tyr Glu Asn Tyr Arg Asp Trp
385                 390                 395                 400

Ile Val Lys Asp Asn Val Ala Tyr Ser Glu Leu Phe Leu Asp Thr Ala
                405                 410                 415

Gly Glu Ala Ser Phe Asp Val Trp Asp Leu Leu Pro Phe Thr Arg Gly
            420                 425                 430

Tyr Val His Ile Leu Asp Lys Asp Pro Tyr Leu Arg His Phe Ala Tyr
            435                 440                 445

Asp Pro Gln Tyr Phe Leu Asn Glu Leu Asp Leu Leu Gly Gln Ala Ala
            450                 455                 460

Ala Thr Gln Leu Ala Arg Asn Ile Ser Asn Ser Gly Ala Met Gln Thr
465                 470                 475                 480

Tyr Phe Ala Gly Glu Thr Ile Pro Gly Asp Asn Leu Ala Tyr Asp Ala
                485                 490                 495

Asp Leu Arg Ala Trp Val Glu Tyr Ile Pro Tyr His Phe Arg Pro Asn
            500                 505                 510

Tyr His Gly Val Gly Thr Cys Ser Met Met Pro Lys Glu Met Gly Gly
            515                 520                 525
```

```
Val Val Asp Asn Ala Ala Arg Val Tyr Gly Val Gln Gly Leu Arg Val
            530                 535                 540
Ile Asp Gly Ser Ile Pro Pro Thr Gln Met Ser Ser His Val Met Thr
545                 550                 555                 560
Val Phe Tyr Ala Met Ala Leu Lys Ile Ala Asp Ala Val Leu Ala Asp
                565                 570                 575
Tyr Ala Ser Met Gln
            580

<210> SEQ ID NO 7
<211> LENGTH: 1746
<212> TYPE: DNA
<213> ORGANISM: Artificial Sequence
<220> FEATURE:
<223> OTHER INFORMATION: synthesized oligonucleotide

<400> SEQUENCE: 7
ggtattgagg cttccttgtt gactgaccca aaggaggtcg ccggtagaac tgttgactac      60
atcattgctg gtggtggatt gactggtttg actgtcgctg ccagattgac tgagaaccca     120
gacatcaccg ttttggtcat tgagtccggt tcttacgaat ctgatagagg tcctatcatt     180
gaagacttga acgcttacgg tgacatcttc ggatcttccg ttgaccacgc ttacgagact     240
gtctgccttg ccactaacaa tcaaaccgct ttgattagat ccggtaacgg tttgggtggt     300
tctactttgg ttaacggagg tacttggacc agaccacaca aggctcaagt tgactcttgg     360
gagaccgtct tcggtaacga aggttggaat tgggattctg tcgcagctta ctccttgcag     420
gccgagagag cccgtgctcc aaacgctaag caaatcgccg caggtcacta cttcaacgcc     480
tcctgtcacg gtattaacgg aactgttcac gctggtccaa gagacaccgg tgacgattac     540
tctcctatcg tcaaggcctt gatgtccgct gttgaagaca gaggtgtccc aactaagaag     600
gacttgggtt gcggagaccc acatggtgtt tctatgttcc ctaacacctt gcacgaggac     660
caagtcagat ccgatgctgc ccgtgaatgg ttgcttccaa actaccaaag acctaacttg     720
caggttttga ccggtcaata cgttggtaag gtccttttgt ctcaaaacgc cactacccca     780
agagctgttg gtgtcgagtt cggaactcac aagggtaaca cccacaatgt ttacgctaaa     840
cacgaagtcc ttttggcagc tggttccgct gtttctccaa ctatcttgga gtactctggt     900
atcggaatga agtccatttt ggaaccactt ggtattaaga ccgtcgttga cttgcctgtt     960
ggtctgaact tgcaagacca gactacctct actgtcagat cccgtattac ctccgccggt    1020
gctggacagg tcaggctgc ctggtttgct actttcaacg agaccttcgg tgactacact    1080
gagaaggctc acgaattgct taacaccaaa ttggaacaat gggctgagga agccgttgct    1140
agaggtggtt ccacaacac taccgctctt ttgatccaat acgagaacta cagagactgg    1200
attgttaagg ataacgtcgc ttactctgaa ttgttcttgg acactgccgg tgaggcttcc    1260
ttcgacgtct gggacttgct gccattcact agaggatacg ttcacatctt ggacaaggac    1320
ccatacttga gacacttcgc ttacgatcct caatacttct gaacgagtt ggacttgctt    1380 ggtcaggctg ccgctactca attggctaga aacatctcta actccggtgc catgcaaact    1440
tactttgctg gtgaaaccat tccaggtgac aacttggcct acgatgctga cttgagagct    1500
tgggttgaat acattccata ccacttcaga cctaactacc atggtgtcgg aacctgttct    1560
atgatgccaa aggagatggg tggtgtcgtt gacaacgccg ctagagtta cggtgtccag    1620 ggattgagag ttatcgacgg ttctatccca cctactcaaa tgtcctctca cgttatgacc    1680
```
gtcttctacg ctatggcttt gaagatcgca gacgctgttt tggctgacta cgcctccatg    1740
caataa    1746

<210> SEQ ID NO 8
<211> LENGTH: 1746
<212> TYPE: DNA
<213> ORGANISM: Artificial Sequence
<220> FEATURE:
<223> OTHER INFORMATION: synthesized oligonucleotide

<400> SEQUENCE: 8
ggtattgagg cttccttgtt gactgaccca aaggaggtcg ccggtagaac tgttgactac      60
atcattgctg gtggtggatt gactggtttg actgtcgctg ccagattgac tgagaaccca     120
gacatcaccg ttttggtcat tgagtccggt tcttacgaat ctgatagagg tcctatcatt     180
gaagacttga acgcttacgg taaaatcttc ggatcttccg ttgaccacgc ttacgagact     240
gtctgccttg ccactaacaa tcaaaccgct tgattagat ccgtaacgg tttgggtggt      300 tctactttgg ttaacggagg tacttggacc agaccacaca aggctcaagt tgactcttgg     360
gagaccgtct tcggtaacga aggttggaat tgggattctg tcgcagctta ctccttgcag     420
gccgagagag cccgtgctcc aaacgctaag caaatcgccg caggtcacta cttcaacgcc     480
tcctgtcacg gtattaacgg aactgttcac gctggtccaa gagacaccgg tgacgattac     540
tctcctatcg tcaaggcctt gatgtccgct gttgaagaca gaggtgtccc aactaagaag     600
gacttgggtt gcggagaccc acatggtgtt tctatgttcc ctaacacctt gcacgaggac     660
caagtcagat ccgatgctgc ccgtgaatgg ttgcttccaa actaccaaag acctaacttg     720
caggttttga ccggtcaata cgttggtaag gtccttttgt ctcaaaacgc cactacccca     780
agagctgttg gtgtcgagtt cggaactcac aagggtaaca cccacaatgt ttacgctaaa     840
cacgaagtcc ttttggcagc tggttccgct gtttctccaa ctatcttgga gtactctggt     900
atcggaatga agtccatttt ggaaccactt ggtattaaga ccgtcgttga cttgcctgtt     960
ggtctgaact tgcaagacca gactacctct actgtcagat cccgtattac ctccgccggt    1020
gctggacagg tcaggctgc ctggtttgct actttcaacg agaccttcgg tgactacact     1080
gagaaggctc acgaattgct taacaccaaa ttggaacaat gggctgagga agccgttgct    1140
agaggtggtt tccacaacac taccgctctt ttgatccaat acgagaacta cagagactgg    1200
attgttaagg ataacgtcgc ttactctgaa ttgttcttgg acactgccgg tgaggcttcc    1260
ttcgacgtct gggacttgct gccattcact agaggatacg ttcacatctt ggacaaggac    1320
ccatacttga gacacttcgc ttacgatcct caatacttct tgaacgagtt ggacttgctt    1380
ggtcaggctg ccgctactca attggctaga aacatctcta actccggtgc catgcaaact    1440
tactttgctg gtgaaaccat tccaggtgac aacttggcct acgatgctga cttgagagct    1500
tgggttgaat acattccata ccacttcaga cctaactacc atggtgtcgg aacctgttct    1560
atgatgccaa aggagatggg tggtgtcgtt gacaacgccg ctagagttta cggtgtccag    1620
ggattgagag ttatcgacgg ttctatccca cctactcaaa tgtcctctca cgttatgacc    1680
gtcttctacg ctatggcttt gaagatcgca gacgctgttt tggctgacta cgcctccatg    1740
caataa    1746

<210> SEQ ID NO 9
<211> LENGTH: 1746
<212> TYPE: DNA
<213> ORGANISM: Artificial Sequence
<220> FEATURE:
<223> OTHER INFORMATION: synthesized oligonucleotide

<400> SEQUENCE: 9

```
ggtattgagg cttccttgtt gactgaccca aaggaggtcg ccggtagaac tgttgactac      60
atcattgctg gtggtggatt gactggtttg actgtcgctg ccagattgac tgagaaccca     120
gacatcaccg ttttggtcat tgagtccggt tcttacgaat ctgatagagg tcctatcatt     180
gaagacttga acgcttacgg taaaatcttc ggatcttccg ttgaccacgc ttacgagact     240
gtctgccttg ccactaacaa tcaaaccgct ttgattagat ccggtaacgg tttgggtggt     300
tctactttgg ttaacggagg tacttggacc agaccacaca aggctcaagt tgactcttgg     360
gagaccgtct tcggtaacga aggttggaat tgggattctg tcgcagctta ctccttgcag     420
gccgagagag cccgtgctcc aaacgctaag caaatcgccg caggtcacta cttcaacgcc     480
tcctgtcacg gtattaacgg aactgttcac gctggtccaa gagacaccgg tgacgattac     540
tctcctatcg tcaaggcctt gatgtccgct gttgaagaca gaggtgtccc aactaagaag     600
gacttgggtt gcggagaccc acatggtgtt tctatgttcc ctaacacctt gcacgaggac     660
caagtcagat ccgatgctgc ccgtgaatgg ttgcttccaa actaccaaag acctaacttg     720
caggttttga ccggtcaata cgttggtaag gtccttttgt ctcaaaacgc cactacccca     780
agagctgttg gtgtcgagtt cggaactcac aagggtaact ttcacaatgt taccgctaaa     840
cacgaagtcc ttttggcagc tggttccgct gtttctccaa ctatcttgga gtactctggt     900
atcggaatga agtccatttt ggaaccactt ggtattaaga ccgtcgttga cttgcctgtt     960
ggtctgaact tgcaagacca gactacctct actgtcagat cccgtattac ctccgccggt    1020
gctggacagg tcaggctgc ctggtttgct acttcaacg agaccttcgg tgactacact     1080
gagaaggctc acgaattgct taacaccaaa ttggaacaat gggctgagga agccgttgct    1140
agaggtggtt tccacaacac taccgctctt ttgatccaat acgagaacta cagagactgg    1200
attgttaagg ataacgtcgc ttactctgaa ttgttcttgg acactgccgg tgaggcttcc    1260
ttcgacgtct gggacttgct gccattcact agaggatacg ttcacatctt ggacaaggac    1320
ccatacttga gacacttcgc ttacgatcct caatacttct tgaacgagtt ggacttgctt    1380
ggtcaggctg ccgctactca attggctaga acatctcta actccggtgc catgcaaact    1440
tactttgctg gtgaaaccat tccaggtgac aacttggcct acgatgctga cttgagagct    1500
tgggttgaat acattccata ccacttcaga cctaactacc atggtgtcgg aacctgttct    1560
atgatgccaa aggagatggg tggtgtcgtt gacaacgccg ctagagttta cggtgtccag    1620
ggattgagag ttatcgacgg ttctatccca cctactcaaa tgtcctctca cgttatgacc    1680
gtcttctacg ctatggcttt gaagatcgca gacgctgttt ggctgactac gcctccatg    1740
caataa                                                                1746
```

<210> SEQ ID NO 10
<211> LENGTH: 1746
<212> TYPE: DNA
<213> ORGANISM: Artificial Sequence
<220> FEATURE:
<223> OTHER INFORMATION: synthesized oligonucleotide

<400> SEQUENCE: 10

```
ggtattgagg cttccttgtt gactgaccca aaggaggtcg ccggtagaac tgttgactac      60
atcattgctg gtggtggatt gactggtttg actgtcgctg ccagattgac tgagaaccca     120
```

-continued

```
gacatcaccg tttggtcat tgagtccggt tcttacgaat ctgatagagg tcctatcatt      180
gaagacttga acgcttacgg taaaatcttc ggatcttccg ttgaccacgc ttacgagact     240
gtctgccttg ccactaacaa tcaaaccgct ttgattagag ctggtaacgg tttgggtggt    300
tctactttgg ttaacggagg tacttggacc agaccacaca aggctcaagt tgactcttgg    360
gagaccgtct tcggtaacga aggttggaat tgggattctg tcgcagctta ctccttgcag    420
gccgagagag cccgtgctcc aaacgctaag caaatcgccg caggtcacta cttcaacgcc    480
tcctgtcacg gtattaacgg aactgttcac gctggtccaa gagacaccgg tgacgattac    540
tctcctatcg tcaaggcctt gatgtccgct gttgaagaca gaggtgtccc aactaagaag    600
gacttgggtt gcggagaccc acatggtgtt tctatgttcc ctaacacctt gcacgaggac    660
caagtcagat ccgatgctgc ccgtgaatgg ttgcttccaa actaccaaag acctaacttg    720
caggttttga ccggtcaata cgttggtaag gtccttttgt ctcaaaacgc cactacccca    780
agagctgttg gtgtcgagtt cggaactcac aagggtaact ttcacaatgt taccgctaaa    840
cacgaagtcc ttttggcagc tggttccgct gtttctccaa ctatcttgga gtactctggt    900
atcggaatga agtccatttt ggaaccactt ggtattaaga ccgtcgttga cttgcctgtt    960
ggtctgaact tgcaagacca gactacctct actgtcagat cccgtattac ctccgccggt   1020
gctggacagg tcaggctgc ctggtttgct actttcaacg agaccttcgg tgactacact    1080
gagaaggctc acgaattgct taacaccaaa ttggaacaat gggctgagga agccgttgct   1140
agaggtggtt ccacaacac taccgctctt ttgatccaat acgagaacta cagagactgg    1200
attgttaagg ataacgtcgc ttactctgaa ttgttcttgg acactgccgg tgaggcttcc    1260
ttcgacgtct gggacttgct gccattcact agaggatacg ttcacatctt ggacaaggac   1320
ccatacttga gacacttcgc ttacgatcct caatacttct gaacgagtt ggacttgctt    1380 ggtcaggctg ccgctactca attggctaga acatctcta actccggtgc catgcaaact    1440
tactttgctg gtgaaaccat tccaggtgac aacttggcct acgatgctga cttgagagct   1500
tgggttgaat acattccata ccacttcaga cctaactacc atggtgtcgg aacctgttct   1560
atgatgccaa aggagatggg tggtgtcgtt gacaacgccg ctagagttta cggtgtccag    1620
ggattgagag ttatcgacgg ttctatccca cctactcaaa tgtcctctca cgttatgacc    1680
gtcttctacg ctatggcttt gaagatcgca gacgctgttt ggctgactac cgcctccatg    1740
caataa                                                               1746
```

<210> SEQ ID NO 11
<211> LENGTH: 1746
<212> TYPE: DNA
<213> ORGANISM: Artificial Sequence
<220> FEATURE:
<223> OTHER INFORMATION: synthesized oligonucleotide

<400> SEQUENCE: 11

```
ggtattgagg cttccttgtt gactgaccca aaggaggtcg ccggtagaac tgttgactac     60
atcattgctg gtggtggatt gactggtttg gttgtcgctg ccagattgac tgagaaccca    120
gacatcaccg tttggtcat tgagtccggt tcttacgaat ctgatagagg tcctatcatt    180
gaagacttga acgcttacgg taaaatcttc ggatcttccg ttgaccacgc ttacgagact    240
gtctgccttg ccactaacaa tcaaaccgct ttgattagag ctggtaacgg tttgggtggt    300
tctactttgg ttaacggagg tacttggacc agaccacaca aggctcaagt tgactcttgg    360
gagaccgtct tcggtaacga aggttggaat tgggattctg tcgcagctta ctccttgcag    420
```

```
gccgagagag cccgtgctcc aaacgctaag caaatcgccg caggtcacta cttcaacgcc    480
tcctgtcacg gtattaacgg aactgttcac gctggtccaa gagacaccgg tgacgattac    540
tctcctatcg tcaaggcctt gatgtccgct gttgaagaca gaggtgtccc aactaagaag    600
gacttgggtt gcggagaccc acatggtgtt tctatgttcc ctaacacctt gcacgaggac    660
caagtcagat ccgatgctgc ccgtgaatgg ttgcttccaa actaccaaag acctaacttg    720
caggttttga ccggtcaata cgttggtaag gtccttttgt ctcaaaacgc cactacccca    780
agagctgttg gtgtcgagtt cggaactcac aagggtaact ttcacaatgt taccgctaaa    840
cacgaagtcc ttttggcagc tggttccgct gtttctccaa ctatcttgga gtactctggt    900
atcggaatga agtccatttt ggaaccactt ggtattaaga ccgtcgttga cttgcctgtt    960
ggtctgaact tgcaagacca gactacctct actgtcagat cccgtattac ctccgccggt   1020
gctggacagg gtcaggctgc ctggtttgct actttcaacg agaccttcgg tgactacact   1080
gagaaggctc acgaattgct taacaccaaa ttggaacaat gggctgagga agccgttgct   1140
agaggtggtt tccacaacac taccgctctt ttgatccaat acgagaacta cagagactgg   1200
attgttaagg ataacgtcgc ttactctgaa ttgttcttgg acactgccgg tgaggcttcc   1260
ttcgacgtct gggacttgct gccattcact agaggatacg ttcacatctt ggacaaggac   1320
ccatacttga dacacttcgc ttacgatcct caatacttct tgaacgagtt ggacttgctt   1380
ggtcaggctg ccgctactca attggctaga acatctcta actccggtgc catgcaaact   1440
tactttgctg gtgaaaccat tccaggtgac aacttggcct acgatgctga cttgagagct   1500
tgggttgaat acattccata ccacttcaga cctaactacc atggtgtcgg aacctgttct   1560
atgatgccaa aggagatggg tggtgtcgtt gacaacgccg ctagagttta cggtgtccag   1620
ggattgagag ttatcgacgg ttctatccca cctactcaaa tgtcctctca cgttatgacc   1680
gtcttctacg ctatggcttt gaagatcgca gacgctgttt tggctgacta cgcctccatg   1740
caataa                                                              1746
```